US010576630B1

(12) United States Patent
Diankov et al.

(10) Patent No.: US 10,576,630 B1
(45) Date of Patent: Mar. 3, 2020

(54) ROBOTIC SYSTEM WITH A ROBOT ARM SUCTION CONTROL MECHANISM AND METHOD OF OPERATION THEREOF

(71) Applicant: Mujin, Inc., Tokyo (JP)

(72) Inventors: Rosen Diankov, Tokyo (JP); Denys Kanunikov, Tokyo (JP)

(73) Assignee: Mujin, Inc., Tokyo (JP)

( * ) Notice: Subject to any disclaimer, the term of this patent is extended or adjusted under 35 U.S.C. 154(b) by 0 days.

(21) Appl. No.: 16/428,333

(22) Filed: May 31, 2019

(51) Int. Cl.
   G06F 19/00 (2018.01)
   B25J 9/16 (2006.01)
   B25J 15/06 (2006.01)
   B25J 13/02 (2006.01)
   B25J 13/08 (2006.01)

(52) U.S. Cl.
   CPC ............ *B25J 9/1633* (2013.01); *B25J 9/161* (2013.01); *B25J 9/163* (2013.01); *B25J 9/1612* (2013.01); *B25J 9/1653* (2013.01); *B25J 9/1661* (2013.01); *B25J 13/02* (2013.01); *B25J 13/082* (2013.01); *B25J 13/085* (2013.01); *B25J 15/0616* (2013.01)

(58) Field of Classification Search
   CPC ...... B25J 9/1633; B25J 9/1653; B25J 13/085; B25J 13/082; B25J 13/02; B25J 15/0616; B25J 9/163; B25J 9/1612; B25J 9/161; B25J 9/1661
   See application file for complete search history.

(56) References Cited

U.S. PATENT DOCUMENTS

| | | | |
|---|---|---|---|
| 9,205,558 B1 | 12/2015 | Zevenbergen et al. | |
| 9,238,304 B1 | 1/2016 | Bradski et al. | |
| 9,333,649 B1 | 5/2016 | Bradski et al. | |
| 9,427,874 B1 | 8/2016 | Rublee | |
| 9,498,887 B1 * | 11/2016 | Zevenbergen | ....... B25J 15/0616 |

(Continued)

FOREIGN PATENT DOCUMENTS

| | | | |
|---|---|---|---|
| JP | 2014210311 A | 11/2014 | |
| JP | 2016132521 A | 7/2016 | |

(Continued)

OTHER PUBLICATIONS

Schmalz et al, Method for the automated dimensioning of gripper system, 6th CIRP conference, CIRP 44, 239-244 (Year: 2016).*

*Primary Examiner* — Ian Jen
(74) *Attorney, Agent, or Firm* — Perspectives Law Group, Corp.

(57) ABSTRACT

A system and method of operation of a robotic system including: receiving a sensor reading associated with a target object; generating a base plan for performing a task on the target object, wherein generating the base plan includes determining a grip point and one or more grip patterns associated with the grip point for gripping the target object based on a location of the grip point relative to a designated area, a task location, and another target object; implementing the base plan for performing the task by operating an actuation unit and one or more suction grippers according to a grip pattern rank, to generate an established grip on the target object, wherein the established grip is at a grip pattern location associated with the grip patterns; measuring the established grip; comparing the established grip to a force threshold; and re-gripping the target object based on the established grip falling below the force threshold.

17 Claims, 8 Drawing Sheets

(56) References Cited

U.S. PATENT DOCUMENTS

| | | | |
|---|---|---|---|
| 9,630,321 B2 | 4/2017 | Bradski et al. | |
| 9,704,126 B1* | 7/2017 | Wellman | B25J 9/1612 |
| 9,987,746 B2 | 6/2018 | Bradski et al. | |
| 10,350,755 B2 | 7/2019 | Wagner et al. | |
| 2001/0052708 A1* | 12/2001 | Schmalz | B65G 47/91 |
| | | | 294/65 |
| 2007/0280812 A1* | 12/2007 | Morency | B25J 15/0253 |
| | | | 414/729 |
| 2010/0032972 A1* | 2/2010 | Braunschweiger | B65G 61/00 |
| | | | 294/185 |
| 2011/0268548 A1* | 11/2011 | Doll | B25J 15/00 |
| | | | 414/688 |
| 2012/0181804 A1 | 7/2012 | Schmidt et al. | |
| 2014/0316572 A1 | 10/2014 | Iwatake | |
| 2016/0089791 A1 | 3/2016 | Bradski et al. | |
| 2016/0137435 A1* | 5/2016 | Tanaka | B25J 15/0014 |
| | | | 414/564 |
| 2016/0207195 A1 | 7/2016 | Eto et al. | |
| 2016/0221187 A1 | 8/2016 | Bradski et al. | |
| 2016/0347558 A1* | 12/2016 | Eto | B65G 47/91 |
| 2017/0225330 A1 | 8/2017 | Wagner et al. | |
| 2018/0178386 A1* | 6/2018 | Eto | B25J 9/1687 |
| 2018/0272535 A1 | 9/2018 | Ogawa et al. | |
| 2018/0297200 A1* | 10/2018 | Nakayama | B25J 9/1612 |
| 2018/0326561 A1* | 11/2018 | Lee | B25J 15/0625 |
| 2019/0084762 A1 | 3/2019 | Fujihara et al. | |
| 2019/0099891 A1 | 4/2019 | Tomioka et al. | |
| 2019/0118391 A1* | 4/2019 | Wu | B25J 15/0061 |

FOREIGN PATENT DOCUMENTS

| | | |
|---|---|---|
| JP | 2017520417 A | 7/2017 |
| JP | 2018158391 A | 10/2018 |
| JP | 2019051575 A | 4/2019 |
| JP | 2019063984 A | 4/2019 |

* cited by examiner

ROBOTIC SYSTEM WITH A ROBOT ARM SUCTION CONTROL MECHANISM AND METHOD OF OPERATION THEREOF

TECHNICAL FIELD

An embodiment of the present invention relates generally to a robotic system and more particularly to a robotic system with a robot arm suction control mechanism.

BACKGROUND

With their ever-increasing performance and lower cost, robots are now extensively used in many fields. Robots, for example, can be used to execute various tasks including manipulating or transferring objects from one place to another. Such tasks are particularly useful in manufacturing, assembly, packing, packaging, warehousing, and shipping. In executing these tasks, robots can replicate human actions, thereby replacing or reducing human involvement that would otherwise require humans to perform dangerous and repetitive tasks. However, despite the technological advancements, robots still lack the sophistication necessary to duplicate human sensitivity, adaptability, and dexterity required for executing more complex tasks. For example, robotic hands or grippers often have difficulty grabbing objects with relatively soft or irregular surfaces, due to lack of sensitivity in contact sensors or insufficient granularity in force control.

Accordingly, there remains a need for improved techniques for controlling and managing a robot's ability to grip and handle objects. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a robotic system including: receiving a sensed reading associated with a target object; generating a base plan for performing a task on the target object, wherein generating the base plan includes determining a grip point and one or more grip patterns associated with the grip point for gripping the target object based on a location of the grip point relative to a designated area, a task location, and another target object; implementing the base plan for performing the task by operating an actuation unit and one or more suction grippers according to a grip pattern rank, to generate an established grip on the target object, wherein the established grip is at a grip pattern location associated with the grip patterns; measuring the established grip; comparing the established grip to a force threshold; and re-gripping the target object based on the established grip falling below the force threshold.

An embodiment of the present invention provides a robotic system including: a communication unit configured to: receive a sensed reading associated with a target object; a control unit, coupled to the communication unit, configured to: generate a base plan for performing a task on the target object, wherein generating the base plan includes determining a grip point and one or more grip patterns associated with the grip point for gripping the target object based on a location of the grip point relative to a designated area, a task location, and another target object; implement the base plan for performing the task by operating an actuation unit and one or more suction grippers according to a grip pattern rank, to generate an established grip on the target object, wherein the established grip is at a grip pattern location associated with the grip patterns; measure the established grip; compare the established grip to a force threshold; and re-grip the target object based on the established grip falling below the force threshold.

An embodiment of the present invention provides a non-transitory computer readable medium including instructions for a robotic system including: receiving a sensed reading associated with a target object; generating a base plan for performing a task on the target object, wherein generating the base plan includes determining a grip point and one or more grip patterns associated with the grip point for gripping the target object based on a location of the grip point relative to a designated area, a task location, and another target object; implementing the base plan for performing the task by operating an actuation unit and one or more suction grippers according to a grip pattern rank, to generate an established grip on the target object, wherein the established grip is at a grip pattern location associated with the grip patterns; measuring the established grip; comparing the established grip to a force threshold; and re-gripping the target object based on the established grip falling below the force threshold.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
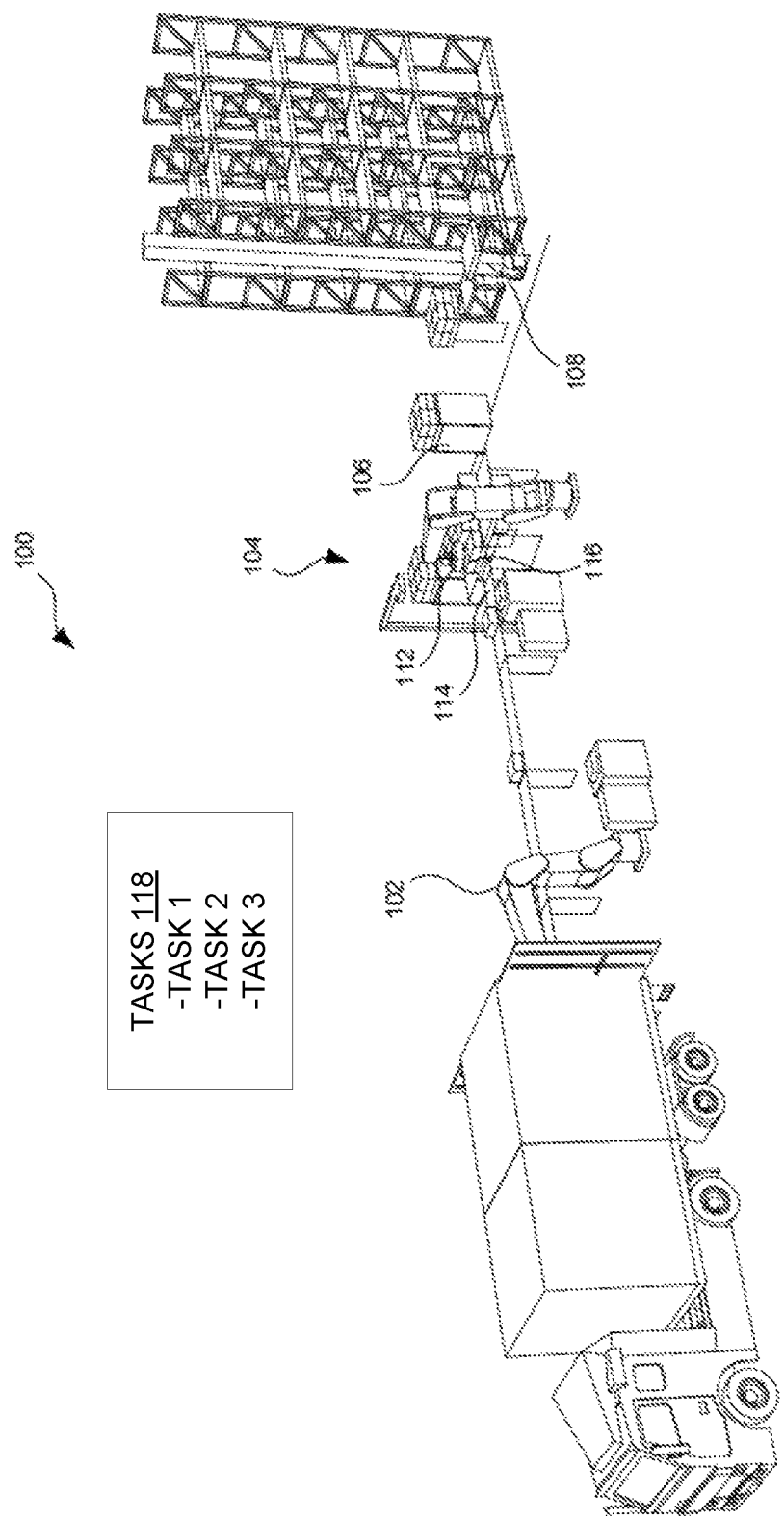
FIG. 1 is an example environment in which a robotic system with a robot arm suction control mechanism can operate.

The following embodiments are described in sufficient detail to enable those skilled in the art to make and use the invention. It is to be understood that other embodiments are evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without some of these specific details. In order to avoid obscuring an embodiment of the present invention, some well-known structures, circuits, system configurations, and process steps are not disclosed in detail.

The drawings showing embodiments of the system and method are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the invention can be operated in any orientation. The embodiments have been numbered one embodiment, second embodiment, etc. as a matter of descriptive convenience and are not intended to have any other significance or provide limitations for an embodiment of the present invention.

The term "module" or "unit" referred to herein can include software, hardware, mechanical mechanisms, or a combination thereof in an embodiment of the present invention, in accordance with the context in which the term is used. For example, the software can be machine code, firmware, embedded code, or application software. Also, for example, the hardware can be circuitry, a processor, a special purpose computer, an integrated circuit, integrated circuit cores, a pressure sensor, an inertial sensor, a microelectromechanical system (MEMS), a passive device, or a combination thereof. Furthermore, the mechanical mechanism can include actuators, motors, arms, joints, handles, end effectors, guides, mirrors, anchoring bases, vacuum lines, vacuum generators, liquid source lines, or stoppers. Further, if a "module" or "unit" is written in the system claims section below, the "module" or "unit" is deemed to include hardware circuitry for the purposes and the scope of the system claims.

The modules or units in the following description of the embodiments can be coupled or attached to one another as described or as shown. The coupling or attachment can be direct or indirect without or with intervening items between coupled or attached modules or units. The coupling or attachment can be by physical contact or by communication between modules or units.

Referring now to FIG. 1, therein is shown an example environment in which a robotic system 100 with a robot arm suction control mechanism can operate. The robotic system 100 can include one or more structures or units, such as robots or robotic devices, configured to execute one or more tasks 118. Aspects of the robot arm suction control mechanism can be practiced or implemented by the various structures. In one embodiment, the robotic system 100 can include an arm unit 102, a transfer unit 104, a transport unit 106, a loading unit 108, or a combination thereof in a warehouse, a distribution center, or a shipping hub.

The robotic system 100 or a portion of the robotic system 100 can be configured to execute the tasks 118. The tasks 118 are the functions performed or executed by the robotic system 100 for the physical transformation upon the arm unit 102, the transfer unit 104, the transport unit 106, the loading unit 108, or a combination thereof. For example, the tasks 118 can include moving a target object 112 from one location, such as a container, bin, cage, basket, shelf, platform, pallet, or conveyor belt, to another location based on physical transformations upon the arm unit 102, the transfer unit 104, the transport unit 106, the loading unit 108, or a combination thereof. The tasks 118 can be combined in sequence to perform an operation that achieves a goal, including loading or unloading the target object 112.

The target object 112 is the article that will be or is currently handled by the robotic system 100. For example, the target object 112 can include boxes, cases, rigid bodies, semi-rigid bodies, articles with flexible surfaces, or a combination thereof. As another example, the tasks 118 can cause the robotic system 100 to unload or load the target object 112 from or to a vehicle, such as a truck, trailer, a van, or train car, for storage in a warehouse or to unload the target object 112 from storage locations and load it onto a vehicle for shipping. Portions of the robotic system 100 can be configured to execute a sequence of actions, such as operating one or more components therein, to execute the tasks 118. As an example, portions of the robotic system 100 can be configured independently, individually, or separately from one another. Also as an example, portions of the robotic system 100 can be configured together, as groups, in a coordinated manner, in a sequenced manner, or a combination thereof. FIG. 1 illustrates examples of the possible functions and operations that can be performed by the various units of the robotic system 100 in handling the target object 112, and it is understood that the environment and conditions can differ from those described hereinafter.

The arm unit 102 can be a robotic arm configured to handle the target object 112. The arm unit 102 can be used as a vehicle offloading robot configured to transfer the target object 112 from one location to another. As an example, the arm unit 102 can be a piece-picking robot configured to transfer the target object 112 from one container to another container. In another example, the arm unit 102 can be, for example, a palletizing robot. As an example, the arm unit 102 can transfer the target object 112 from a location in a carrier, such as a truck or a container, to a location on a conveyor belt. Also for example, the arm unit 102 can be used to load the target object 112 onto the carrier. Further details of the arm unit 102 will be discussed below.

The transfer unit 104 can be a fixed piece of mechanical handling equipment that moves the target object 112 from one location to another, for example a conveyor belt. As an example, the transfer unit 104 can move the target object 112 on a conveyor belt to a location on the transport unit 106, such as for loading the target object 112 on a pallet on the transport unit 106.

The transport unit 106 can be a mobile robot used to transfer the target object 112 from an area associated with the transfer unit 104 to an area associated with the loading unit 108. The transport unit 106 can be, for example, a transport robot, a delivery drone, a delivery robot, a fork lift, or a combination thereof.

The loading unit 108 can be configured to transfer the target object 112, such as by moving the pallet carrying the target object 112 from the transport unit 106 to a further storage location, such as a location on one or more shelves. The loading unit 108 can be, for example, a freight elevator, a warehouse elevator, a cargo lift, or a combination thereof.

As a further example, the tasks 118 can include transferring the target object 112 from one or more designated areas 114 to a task location 116. For example, the designated areas 114 can include receptacles for storage of the target object 112, such as cages, bins, boxes, pallets, or a combination thereof. The designated areas 114 can include numerous configurations and forms. For example, the designated areas 114 can be a platform, with or without walls, on which the target object 112 can be placed or stacked, such as a pallet, a shelf, or a conveyor belt. As another example, the designated areas 114 can be a partially or fully enclosed receptacle with walls or a lid in which the target object 112 can be placed, such as a bin, cage, or basket. In some embodiments, the walls of the designated areas 114 with the partially or fully enclosed receptacle can be transparent or can include openings or gaps of various sizes such that portions of the target object 112 contained therein can be visible or partially visible through the walls. The task location 116 can be an area where the target object 112 is placed to have tasks 118 performed on it, or an area designated as an end point or starting point where the tasks 118 are performed on the target object 112.

For illustrative purposes, the robotic system 100 is described in the context of a shipping center, although it is understood that the robotic system 100 can be configured to execute the tasks 118 in other environments or for other purposes. As examples, the robotic system 100 can operate in environments for manufacturing, assembly, packaging, healthcare, or other types of automation. It is also understood that the robotic system 100 can include other units, such as manipulators, service robots, modular robots, that are not shown in FIG. 1. For example, in some embodiments, the robotic system 100 can include a de-palletizing unit for transferring the target object 112 from cage carts or pallets onto conveyors or other pallets, a container-switching unit for transferring the target object 112 from one container to another, a packaging unit for wrapping the target object 112, a sorting unit for grouping the target object 112 according to one or more characteristics thereof, a piece-picking unit for manipulating the target object 112 differently, such as sorting, grouping, or transferring, according to one or more characteristics thereof, or a combination thereof.

Figure 2:
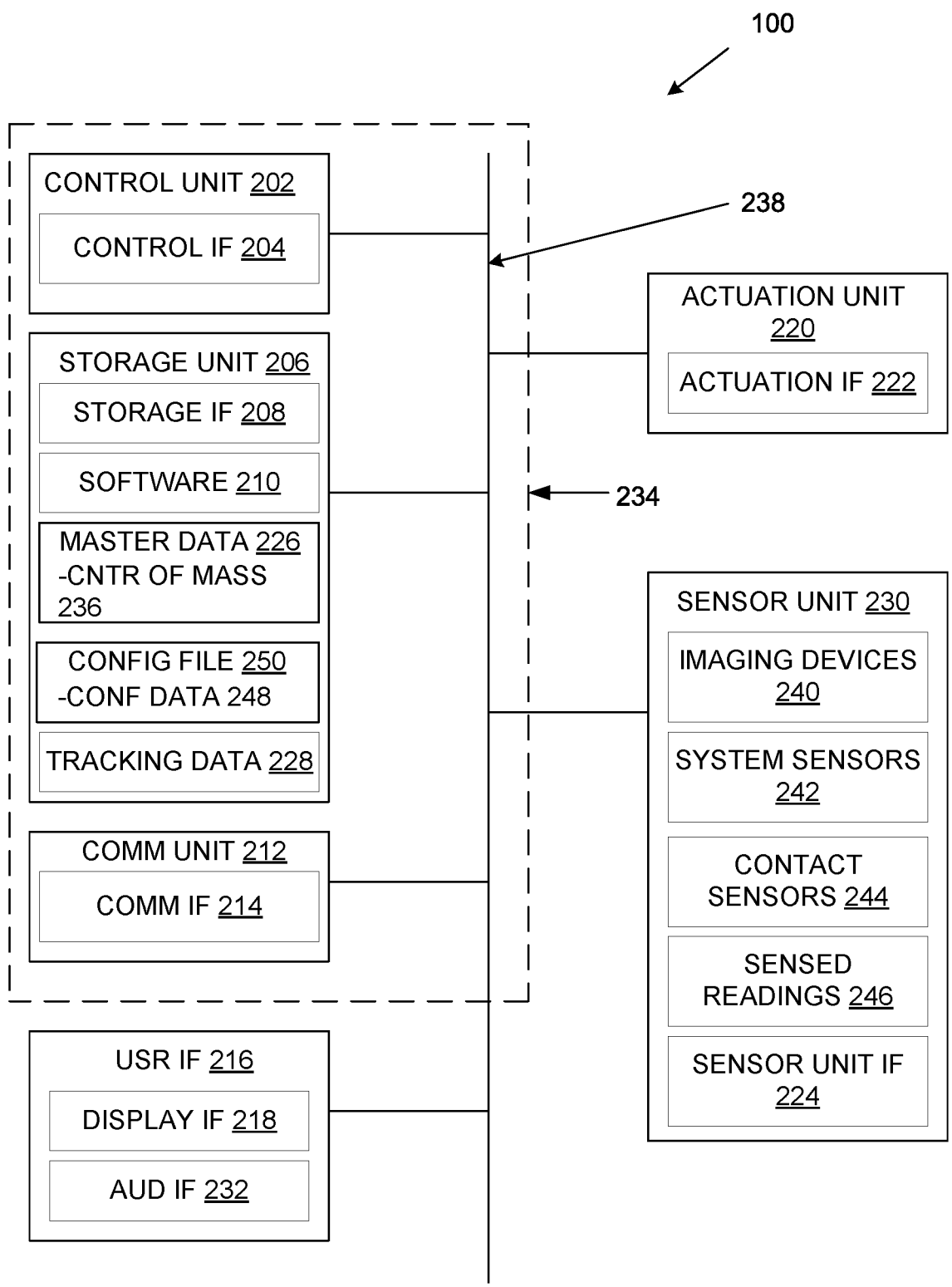
FIG. 2 is an exemplary block diagram of the components of the robotic system.

Referring now to FIG. 2, therein is shown an exemplary block diagram of the components of the robotic system 100. In one embodiment, the robotic system 100 can include a control unit 202, a storage unit 206, a communication unit 212, a user interface 216, an actuation unit 220, and a sensor unit 230. In one embodiment, one or more of these components can be combined in an enclosure 234.

The enclosure 234 can be a housing with a portion of the robotic system 100 contained therein. The enclosure 234 can separate portions of the robotic system 100 contained within, from other portions external to the enclosure 234. For example, the enclosure 234 can be a case, a chassis, a box, a console, a computer tower, or a computer motherboard. In one embodiment, for example, the control unit 202, the storage unit 206, the communication unit 212, or a combination thereof can be housed in the enclosure 234. In another embodiment, the control unit 202, the storage unit 206, the communication unit 212, or a combination thereof can be housed in the enclosure 234 while the user interface 216, can be accessible external to the enclosure 234.

While one or more components of the robotic system 100 can be housed in or on the enclosure 234, other components of the robotic system 100 can be external to the enclosure 234. For example, in one embodiment, the user interface 216, the actuation unit 220, the sensor unit 230, or a combination thereof can be external to the enclosure 234, while the control unit 202, the storage unit 206, and the communication unit 212, are housed in the enclosure 234. The aforementioned are merely examples of components that can be housed in or on the enclosure 234 and are not meant to be limiting. Other combinations of components can be housed in the enclosure 234.

The control unit 202 can execute a software 210 to provide the intelligence of the robotic system 100. The control unit 202 can also execute the software 210 for the other functions of the robotic system 100. The control unit 202 can be implemented in a number of different ways. For example, the control unit 202 can be a processor, an application specific integrated circuit (ASIC), an embedded processor, a microprocessor, a hardware control logic, a hardware finite state machine (FSM), a digital signal processor (DSP), or a combination thereof.

The control unit 202 can include a control interface 204. The control interface 204 can be used for communication between the control unit 202 and other functional units of the robotic system 100. The control interface 204 can also be used for communication that is external to the robotic system 100. The control interface 204 can receive information from the other functional units or from external sources, or can transmit information to the other functional units or to external destinations. The external sources and the external destinations refer to sources and destinations external to the robotic system 100.

The control interface 204 can be implemented in different ways and can include different implementations depending on which functional units or external units are being interfaced with the control interface 204. For example, the control interface 204 can be implemented with a pressure sensor, an inertial sensor, a microelectromechanical system (MEMS), optical circuitry, waveguides, wireless circuitry, wireline circuitry, an application programming interface, or a combination thereof.

The storage unit 206 can store the software 210, a master data 226, an object tracking data 228, a configuration data 248, or a combination thereof. For illustrative purposes, the storage unit 206 is shown as a single element, although it is understood that the storage unit 206 can be a distribution of storage elements. Also for illustrative purposes, the robotic system 100 is shown with the storage unit 206 as a single hierarchy storage system, although it is understood that the robotic system 100 can have the storage unit 206 in a different configuration. For example, the storage unit 206 can be formed with different storage technologies forming a memory hierarchal system including different levels of caching, main memory, rotating media, or off-line storage.

The storage unit 206 can be a volatile memory, a nonvolatile memory, an internal memory, an external memory, or a combination thereof. For example, the storage unit 206 can be a nonvolatile storage such as non-volatile random access memory (NVRAM), Flash memory, disk storage, or a volatile storage such as static random access memory (SRAM).

The storage unit 206 can include a storage interface 208. The storage interface 208 can be used for communication between the storage unit 206 and other functional units of the robotic system 100. The storage interface 208 can also be used for communication that is external to the robotic system 100. The storage interface 208 can receive information from the other functional units of the robotic system 100 or from external sources, or can transmit information to the other functional units of the robotic system 100 or to external destinations. The external sources and the external destinations refer to sources and destinations external to the robotic system 100.

The storage interface 208 can include different implementations depending on which functional units or external units are being interfaced with the storage unit 206. The storage interface 208 can be implemented with technologies and techniques similar to the implementation of the control interface 204.

In one embodiment, the storage unit 206 can be used to further store and provide access to processing results, data, thresholds, or a combination thereof. The processing results, data, thresholds, or a combination thereof can constitute the master data 226. The master data 226 can include descriptions of the target object 112 of FIG. 1, for example, boxes, box types, cases, case types, products, or a combination thereof. In one embodiment, the master data 226 can include a dimension, a shape, for example, templates for potential orientations or computer-generated models for recognizing the target object 112 in different orientations, a color scheme, an image, identification information, for example, bar codes, quick response (QR) codes, logos, expected dimensions, an expected weight, or a combination thereof for the target object 112. In one embodiment, the master data 226 can further include manipulation-related information regarding the target object 112, such as a center of mass 236 location on the target object 112, or expected sensor measurements, for example, force, torque, pressure, or contact measurements, corresponding to one or more actions, maneuvers, or a combination thereof.

In one embodiment, the storage unit 206 can further store a configuration data 248. The configuration data 248 refers to parameters and initial setting information for one or more components of the robotic system 100, or one or more components external to the robotic system 100 that are needed to operate the one or more components of the robotic system 100 or the external components. For example, such configuration information can include information regarding what components to turn "on" or "off," when to activate components, for example when to turn on/off one or more components, or other setting variables, thresholds, or operating data necessary to operate the one or more components. In one embodiment, the configuration data 248 can be stored in a configuration file 250. The configuration file 250 refers to a computer file, such as a text file, that contains the parameter and initial setting information.

In one embodiment, the storage unit 206 can further store the object tracking data 228. The object tracking data 228 can be data indicating the location, position, status, or a combination thereof of the target object 112. The object tracking data 228 can include a log of scanned or manipulated target objects 112. In some embodiments, the object tracking data 228 can include imaging data, for example, a picture, point cloud/depth view, live video feed, or a combination thereof of the target object 112 at one or more locations, for example, designated pickup or drop-off locations or conveyor belts. In some embodiments, the object tracking data 228 can include locations and orientations of the target object 112 at the one or more locations.

The communication unit 212 can enable communication to and from the robotic system 100, including communication between functional units of the robotic system 100, external devices, or a combination thereof. For example, the communication unit 212 can permit the robotic system 100 to communicate with an external device, such as an external computer, an external database, an external machine, an external peripheral device, or a combination thereof through a communication path 238.

The communication path 238 can span and represent a variety of networks and network topologies. For example, the communication path 238 can include wireless communication, wired communication, optical communication, ultrasonic communication, or the combination thereof. For example, satellite communication, cellular communication, Bluetooth, Infrared Data Association standard (lrDA), wireless fidelity (WiFi), and worldwide interoperability for microwave access (WiMAX) are examples of wireless communication that can be included in the communication path 238. Cable, Ethernet, digital subscriber line (DSL), fiber optic lines, fiber to the home (FTTH), and plain old telephone service (POTS) are examples of wired communication that can be included in the communication path 238. Further, the communication path 238 can traverse a number of network topologies and distances. For example, the communication path 238 can include direct connection, personal area network (PAN), local area network (LAN), metropolitan area network (MAN), wide area network (WAN), or a combination thereof. The control unit 202 can further execute the software 210 for interaction with the communication path 238 via the communication unit 212.

The communication unit 212 can also function as a communication hub allowing the robotic system 100 to function as part of the communication path 238 and not be limited to be an end point or terminal unit to the communication path 238. The communication unit 212 can include active and passive components, such as microelectronics or an antenna, for interaction with the communication path 238.

The communication unit 212 can include a communication interface 214. The communication interface 214 can be used for communication between the communication unit 212 and other functional units of the robotic system 100. The communication interface 214 can receive information from the other functional units of the robotic system 100 or from external sources, or can transmit information to the other functional units of the robotic system 100 or to external destinations. The communication interface 214 can include different implementations depending on which functional units are being interfaced with the communication unit 212. The communication interface 214 can be implemented with technologies and techniques similar to the implementation of the control interface 204.

The control unit 202 can operate the user interface 216 to present or receive information generated by the robotic system 100. The user interface 216 can include an input device and an output device. Examples of the input device of the user interface 216 can include a keypad, a touchpad, soft-keys, a keyboard, a microphone, sensors for receiving remote signals, a camera for receiving motion commands, or any combination thereof to provide data and communication inputs. Examples of the output device can include a display interface 218 and an audio interface 232.

The display interface 218 can be any graphical user interface such as a display, a projector, a video screen, or any combination thereof. The audio interface 232 can include speakers, microphones, headphones, subwoofers, sound components, transducers, or any combination thereof. The display interface 218 and the audio interface 232 allow a user of the robotic system 100 to interact with the robotic system 100. The display interface 218 and the audio interface 232 can be optional.

The robotic system 100 can also include the actuation unit 220. The actuation unit 220 can include devices, for example, motors, springs, gears, pulleys, chains, rails, wires, artificial muscles, electroactive polymers, or a combination thereof, configured to drive, manipulate, displace, orient, re-orient, or a combination thereof, the structural members or mechanical components of the robotic system 100 about or at a corresponding mechanical joint. The control unit 202 can operate the actuation unit 220, to control or manipulate the actuation unit 220.

The actuation unit 220 can include an actuation interface 222. The actuation interface 222 can be used for communication between the actuation unit 220 and other functional units of the robotic system 100. The actuation interface 222 can also be used for communication that is external to the robotic system 100. The actuation interface 222 can receive information from the other functional units of the robotic system 100 or from external sources, or can transmit information to the other functional units or to external destinations.

The actuation interface 222 can include different implementations depending on which functional units of the robotic system 100 or external units are being interfaced with the actuation unit 220. The actuation interface 222 can be implemented with technologies and techniques similar to the implementation of the control interface 204.

The robotic system 100 can include the sensor unit 230 configured to obtain the sensor readings 246 used to execute the tasks 118 and operations, such as for manipulating the structural members. The sensor readings 246 can include information or data obtained by the sensor unit 230 the purpose of which is to detect events or changes in the environment of the robotic system 100 and to send the information to components of the robotic system 100, external devices, or a combination thereof to facilitate the tasks 118. The sensor readings 246 can include, for example, image readings, for example, a digital image or a point cloud/depth view. The sensor readings 246 can further include quantified measures, for example, measures of forces, torques, rotations, speeds, distances, or a combination thereof.

The sensor unit 230 can include devices configured for detection or measurement of the sensor readings 246. For example, the sensor unit 230 can be configured to detect or measure one or more physical properties of the robotic system 100, such as a state, a condition, a location of one or more structural members or joints, information about objects or a surrounding environment, or a combination thereof. As an example, the sensor unit 230 can include various sensors including imaging devices 240, system sensors 242, contact sensors 244, or a combination thereof.

In some embodiments, the sensor unit 230 can include one or more of the imaging devices 240. The imaging devices 240 are devices configured to capture, recognize, detect, or a combination thereof the surrounding environment of the robotic system 100. For example, the imaging devices 240 can include two-dimensional (2D) cameras, three-dimensional (3D) cameras, both of which can include a combination of visual and infrared capabilities, lidars, radars, other distance-measuring devices, and other imaging devices. The imaging devices 240 can generate a representation of the environment of the robotic system 100, such as a digital image or a point cloud/depth view, used for implementing machine/computer vision for automatic inspection, robot guidance, or other robotic applications.

In some embodiments, the sensor unit 230 can include the system sensors 242. The system sensors 242 are devices configured to monitor the robotic system 100. For example, the system sensors 242 can include units or devices to detect and monitor positions of structural members, such as the robotic components and the end-effectors, corresponding joints of the robotic system 100 or a combination thereof. As a further example, the robotic system 100 can use the system sensors 242 to track locations, orientations, or a combination thereof of the structural members and the joints during execution of the tasks 118. Examples of the system sensors 242 can include accelerometers, gyroscopes, or position encoders.

In some embodiments, the sensor unit 230 can include the contact sensors 244, such as pressure sensors, force sensors, strain gauges, piezoresistive/piezoelectric sensors, capacitive sensors, elastoresistive sensors, torque sensors, linear force sensors, or other tactile sensors, configured to measure a characteristic associated with a direct contact between multiple physical structures or surfaces.

The sensor unit 230 can include a sensor unit interface 224. The sensor unit interface 224 can be used for communication between the sensor unit 230 and other functional units of the robotic system 100. The sensor unit interface 224 can also be used for communication that is external to the robotic system 100. The sensor unit interface 224 can receive information from the other functional units of the robotic system 100 or from external sources, or can transmit information to the other functional units of the robotic system 100 or to external destinations.

The sensor unit interface 224 can include different implementations depending on which functional units of the robotic system 100 or external units are being interfaced with the sensor unit 230. The sensor unit interface 224 can be implemented with technologies and techniques similar to the implementation of the control interface 204.

Figure 3:
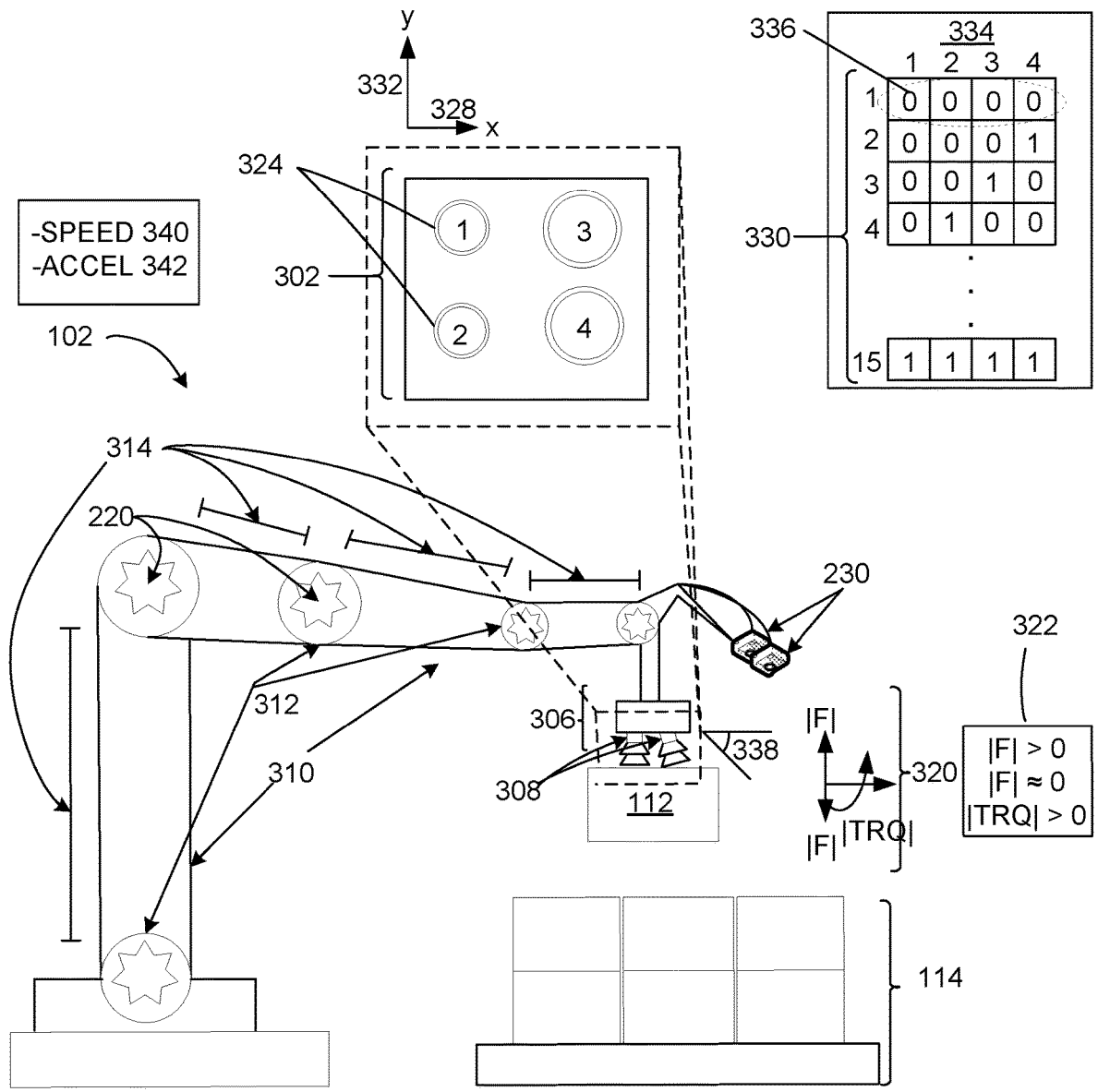
FIG. 3 is an example of the arm unit in accordance with one or more embodiments of the present invention.

Referring now to FIG. 3, therein is shown an example of the arm unit 102 in accordance with one or more embodiments of the present invention. The arm unit 102 can include a robotic arm 310. The arm unit 102 can further include the sensor unit 230, a gripping unit 306, and one or more suction grippers 308.

In one embodiment, the sensor unit 230 can be attached to the robotic arm 310, the gripping unit 306, the suction grippers 308, or a combination thereof. The gripping unit 306 can also attach to the robotic arm 310. The suction grippers 308 can also attach to the gripping unit 306, and can be configured to grip the target object 112.

The robotic arm 310 functions to allow manipulation of the target object 112 via the gripping unit 306, the suction grippers 308, the sensor unit 230, or a combination thereof. The robotic arm 310 can include one or more arm sections 314 which are mechanical subsections of the robotic arm 310, which as a whole make up the robotic arm 310. In one embodiment, the robotic arm 310 can also include one or more mechanical structural joints 312 connecting to the arm sections 314. The structural joints 312 connect the arm sections 314 to one another and can act as pivot points that can enable rotational and translational movements of the arm sections 314, the gripping unit 306, the sensor unit 230, or a combination thereof. In one embodiment, the structural joints 312 can form a kinetic chain configured to manipulate the arm sections 314, the gripping unit 306, the sensor unit 230, or a combination thereof.

In one embodiment, the arm unit 102 can also include the actuation unit 220 configured to drive or manipulate the structural joints 312, the arm sections 314, the gripping unit 306, the sensor unit 230, or a combination thereof, about, at, or connected to the structural joints 312. The actuation unit 220 functions to cause the structural joints 312, the arm sections 314, the gripping unit 306, the suction grippers 308, the sensor unit 230, or a combination thereof to perform or undergo rotational and translational movements. In one embodiment, the actuation unit 220 can be incorporated within the structural joints 312, the arm sections 314, the gripping unit 306, the suction grippers 308, or a combination thereof. In another embodiment, the actuation unit 220 can be external to the structural joints 312, the arm sections 314, the gripping unit 306, the suction grippers 308, or a combination thereof.

The arm unit 102 can also include the sensor unit 230. In one embodiment, the sensor unit 230 can include the devices configured to detect or measure the sensor readings 246. For example, the arm unit 102 can include the devices configured to detect and measure one or more physical properties of the robotic system 100, such as the system sensors 242 of FIG. 2. Examples of the physical properties can include a state, a condition, or a location of the structural joints 312, a location of the arm sections 314, a location of the gripping unit 306, a status of the suction grippers 308, or a combination thereof. The system sensors 242 can be used to detect the location of the structural joints 312, the location of the arm sections 314, the location of the gripping unit 306, or a combination thereof. The robotic system 100 can use the system sensors 242 to track locations and orientations of the structural joints 312, the arm sections 314, the gripping unit 306, or a combination thereof during execution of the tasks 118, and save these sensor readings 246 as part of the object tracking data 228.

Also for example, the sensor unit 230 can further include one or more of the imaging devices 240 of FIG. 2. The imaging devices 240 can generate a representation of the detected environment, such as a digital image or a point cloud/depth view, which can be further used for implementing machine or computer vision, for example, for automatic inspection, robot guidance, or other robotic applications. The robotic system 100 can store and process the digital image or the point cloud/depth view to identify, grip, and facilitate the manipulation or transport of the target object 112. In one embodiment, the digital image or the point cloud/depth view can be stored in the storage unit 206.

For example, in one embodiment, the sensor unit 230 can capture, and the robotic system 100 can store an image of the designated areas 114, such as inside a truck, inside a container, or a pickup location for the target object 112. Similarly, the sensor unit 230 can capture, and the robotic system 100 can store an image of other instances or locations of the designated areas 114 or task locations 116, such as a drop location for placing the target object 112 on a conveyor belt, a location for placing the target object 112 inside a container, or a location on a pallet for stacking the target object 112.

In another embodiment, the sensor unit 230 can further be used to identify the target object 112. For example, the sensor unit 230 can capture, and the robotic system 100 can store an image of the target object 112, a container containing the target object 112, or a combination thereof, and determine what type of object the target object 112 is, such that the robotic system 100 can determine how to manipulate, grip, and transport the target object 112 using the suction grippers 308.

In another embodiment, the sensor unit 230 can further include the contact sensors 244 of FIG. 2. The contact sensors 244 can measure a characteristic that corresponds to a grip of the suction grippers 308 on the target object 112. Accordingly, the contact sensors 244 can output a contact measure 320 that represents a quantified measure, for example, a measured force, torque, or position, corresponding to an attachment between the suction grippers 308 and the target object 112. For example, the contact measure 320 can include one or more force, torque, or pressure readings associated with forces applied to the target object 112 by the suction grippers 308.

In one embodiment, the robotic system 100 can generate instructions for implementing different actions to accomplish the tasks 118 based on the contact measure 320, including gripping, re-gripping, moving, or a combination thereof of the target object 112. For example, the instructions can include for the arm unit 102 to grip or re-grip the target object 112 if the initial value of the contact measure 320 is above or below a force threshold 322. Also, the instructions can include for the arm unit 102 to intentionally drop the target object 112, adjust the location of the arm sections 314, the gripping unit 306, the suction grippers 308, or a combination thereof, during the tasks 118 and can include further adjusting a speed or an acceleration of the arm sections 314 during the tasks 118, or a combination thereof if the contact measure 320 falls below or above the force threshold 322 during execution of the tasks 118.

The force threshold 322 refers to a condition that the robotic system 100 or one or more of the components of the robotic system 100 compares the one or more force, torque, or pressure readings on the target object 112 against to determine whether gripping of the target object 112 can be maintained to accomplish the tasks 118. The force threshold 322 can be predetermined by a user of the robotic system and can vary based on the size and material composition of the suction grippers 308 used by the robotic system 100 to grip the target object 112.

It has been discovered that using suction grippers 308 that cover large surface areas can hold target objects 112 with greater force and therefore, the force threshold 322 associated with those suction grippers 308 can be a higher value as compared to a suction gripper that covers smaller surface areas. Further details regarding the suction grippers 308 and how the force threshold 322 is used is discussed below.

The arm unit 102 can also include the gripping unit 306. The gripping unit 306 can be configured, in conjunction with the suction grippers 308, to facilitate the gripping of the target object 112 via attractive forces, which are achieved by forming and maintaining a vacuum condition between the gripping unit 306, the suction grippers 308, or a combination thereof and the target object 112. For example, the gripping unit 306 can include the suction grippers 308 configured to contact surfaces of the target object 112 and form the vacuum condition in the spaces between the suction grippers 308 and the surfaces of the target object 112. Further details of the configuration of the gripping unit 306 and the suction grippers 308 will be discussed below.

The vacuum condition can be created when the gripping unit 306 is lowered via the robotic arm 310, thereby pressing the suction grippers 308 against a surface of the target object 112, and pushing out air or gases between the opposing surfaces. In one embodiment, the suction grippers 308 can be pressed against a surface of the target object 112 until the robotic system 100 determines that a grip on the target object 112 has been established. For example, to determine when to stop pressing against the surface of the target object 112, in one embodiment, the contact sensor 244 can generate the contact measure 320 indicating a pressure between the suction grippers 308 and the surface of the target object 112. The robotic system 100 can compare the contact measure 320 against the force threshold 322 to determine whether the contact measure 320 is equal to or greater than the force threshold 322. If equal or greater than the force threshold 322, the robotic system 100 can determine that the suction grippers 308 are sufficiently pressed against the target object 112 to maintain a grip on the target object 112.

Once a grip has been established the arm unit 102 can attempt to lift of the target object 112. When the robotic arm 310 lifts the gripping unit 306, the contact sensor 320 can further measure a difference in pressure between the spaces inside the suction grippers 308 and the surrounding environment to determine if the pressure is sufficient to keep the target object 112 attached to the suction grippers 308. Accordingly, a degree of grip or attachment of the gripping unit 306 and the suction grippers 308 on the target object 112 can be based on the number of the suction grippers 308 successfully creating and holding the vacuum condition.

In one embodiment, the gripping unit 306 can include the suction grippers 308. The suction grippers 308 are mechanical devices that use the negative fluid pressure of air or water to adhere to nonporous surfaces to create the vacuum condition. The suction grippers 308 are configured to hold or affix the target object 112 via attractive forces. The suction grippers 308 can include one or more suction cups 324 attached to their distal end which can be configured to contact the surfaces of the target object 112 and retain the vacuum condition in the spaces between the suction cups 324 and the surfaces of the target object 112.

The suction cups 324 can contact surfaces of the target object 112 along planes, edges, or an angle 338. Further, the ability to contact surfaces of the target object 112 at the angle 338 allows the suction grippers 308 to grip the target object 112 that may have moved or have been displaced and is resting with one of its sides at the angle 338 from a horizontal plane, for example along a plane parallel to the bottom of the container in or on which the target object 112 is located.

It has been discovered that the ability of the suction cups 324 to maintain a grip on the target object 112 at the angle 338 depends on the size of the suction cups 324. For example, the larger the size of the suction cups 324 the greater the angle 338 at which the suction cups 324 can grip the target object 112.

The suction cups 324 can be implemented in accordance to a variety of shapes and sizes. The suction cups 324 can further be made of different materials. For example, in one embodiment, the suction cups 324 can be implemented as circles, and can be made of flexible material, including plastic, silicone, nitrile, viton, vinyl, urethane, rubber, that provides the suction cups 324 the ability to flex or bend when picking up the target object 112.

It has been discovered that the force applied by the suction cups 324 correlates to the size and shape of the suction cups 324 such that the larger the suction cups 324 the greater the force is that can be applied by the suction grippers 308, the suction cups 324, or a combination thereof to the target object 112. It has been further discovered that the force of the suction cups 324 is directly correlated to the effective surface area covered by the suction cups 324 and can be characterized by the formula:

$$F=(\Delta P)(A) \qquad (1)$$

In the above formula, "F" represents the force applied by the suction cup 324 via the vacuum condition, "$\Delta P$" represents the difference between ambient pressure and vacuum pressure between the suction cups 324 and the target object 112, and "A" represents the effective surface area covered by the suction cup 324. Thus, for example, in the embodiment where the suction cups 324 are implemented as, for example circles, the suction cups 324 with larger diameters can apply greater force on the target object 112.

It has been further discovered that the size and shape of the suction cups 324 affect the ability of the suction cups 324 to grip the target object 112. For example, the larger the suction cups 324 are, the less well suited the suction cups 324 are for gripping the target object 112 with surfaces that contain fragile materials or contain fragile films that can bend, break, or damage easily when small amounts of force are applied to them, because the suction cups 324 with the larger diameters can apply greater force on the target object 112, and as a result can potentially damage the surfaces of the target object 112.

It has been further discovered that the material composition of the suction cups 324 affects the ability of the suction cups 324 to grip the target object 112. For example, the suction cups 324 made of materials that allow the suction cups 324 to be flexible or soft are better suited for applications for gripping malleable objects, for example bags, because the flexible or soft characteristic of the suction cups 324 can flex or bend to the surface of the target object 112 and provide a tighter grip on the target object 112.

In one embodiment, the arm unit 102 can further include a vacuum hose (not shown) and a vacuum generator (not shown) attached to the gripping unit 306, the suction grippers 308, or a combination thereof to create the vacuum condition. For example, in one embodiment when contact is detected by the sensor unit 230 between the suction cups 324 and the surface of the target object 112, the vacuum generator can be activated by the robotic system 100 to draw out air from between the suction cups 324 and the surfaces of the target object 112 to create the vacuum condition. As a result, the air pressure between the suction grippers 308 and the surfaces of the target object 112 is made to be lower than that outside the environment between the suction grippers 308 and the surfaces of the target object 112, and thus atmospheric pressure can hold the target object 112 against the suction grippers 308. The vacuum generator can include, for example, a vacuum ejector, a blower, or a pump, which can draw out air from between the suction cups 324 and the surfaces of the target object 112 to create the vacuum condition.

In one embodiment, the vacuum generator can adjust or vary the speed at which air is drawn out, such that the strength of the vacuum condition can be varied. Thus, the greater the speed at which the air is drawn out, the greater the difference between ambient pressure and vacuum pressure between the suction cups 324 and the surfaces of the target object 112, and the stronger the vacuum condition generated. Further, the vacuum condition can also be varied depending on the size of the suction cups 324. For example, the larger the surface area covered by the suction cups 324, the greater the vacuum condition when air is drawn out at higher speeds by the vacuum generator.

In one embodiment, the gripping unit 306 can also include the sensor unit 230. For example, the gripping unit 306 can include the contact sensors 244 configured to determine the contact measure 320. The contact sensors 244 can generate the contact measure 320 as a representation of an attachment of the gripping unit 306, the suction grippers 308, or a combination thereof to the target object 112. In one embodiment, the contact sensors 244 can include touch or tactile sensors configured to indicate whether surfaces are contacting another surface and can be configured to determine the size of the surface contacting another surface. Also, the contact sensors 244 can include pressure sensors configured to measure the pressure, for example, the vacuum condition between the suction grippers 308 and the surfaces of the target object 112. Also, the contact sensors 244 can include linear force sensors configured to measure the weight of the target object 112, borne or supported by the suction grippers 308.

Further, the contact sensors 244 can include torque sensors configured to measure torque or moment of force on the suction grippers 308, the gripping unit 306, the robotic arm 310, or a combination thereof. In comparison to a fully gripped state, the torque or moment of force measurements can change, for example increase or decrease, such as when some of the suction grippers 308, for example, the suction grippers 308, which are peripherally located, fail to hold the vacuum condition.

The torque measurements can further be used in determining a speed 340 and an acceleration 342 of the arm unit 102 during the execution of the tasks 118. For example, in one embodiment, when the suction grippers 308 grip the target object 112 at a point, for example the center of mass 236 or other point on the target object 112 that is gripped, and begin executing the tasks 118, the torque sensor can measure the torque or moment of force on the target object 112 using the formula:

$$T=(F)(d) \qquad (2)$$

In the above formula, "T" represents the torque or moment of force on the target object 112, "F" represents the force applied to the target object 112 as a result of the rotational movement of the target object 112, and "d" represents the distance from the point, for example the center of mass 236 or other point on the target object 112 that is gripped, to a pivot point, for example the structural joints 312 around which the target object 112 is being rotated.

The robotic system 100 can compare the torque measurement "T" to the force threshold 322, which can represent, for example, the maximum amount of force at which the suction cups 324 can hold to the target object 112. Based on the comparison, the robotic system 100 can determine whether the tasks 118 can successfully be executed without dropping the target object 112. Further, based on the torque measurement the robotic system 100 can compensate for the torque applied to the target object 112, by adjusting the speed 340 and the acceleration 342 of the arm unit 102 to counteract the effects of the torque on the target object 112. As an example, in one embodiment, if the torque measurement is greater than the force threshold 322, such that the suction grippers 308 will lose grip on the target object 112, the robotic system 100 can adjust the speed 340 and the acceleration 342 of the arm unit 102 by, for example, decreasing the speed 340 and the acceleration 342 of the arm unit 102 to lower the torque and allow the suction grippers 308, the suction cups 324, or a combination thereof, to maintain a grip on the target object 112, and deliver the target object 112 without the target object 112 being dropped.

According to the type and location of the contact sensors 244, the contact measure 320 can correspond to a sum or an average of the measurements, for example, the internal pressure, the linear force, the torque, or a combination thereof, across each of the suction grippers 308. In one embodiment, the contact sensors 244 attached to the gripping unit 306, the suction grippers 308, or a combination thereof can determine a non-zero reading associated with the weight borne by the suction grippers 308. Such weight can correspond to a linear force or a torque, which can be used to determine whether the suction grippers 308 have sufficient grip on the target object 112, such that the tasks 118 including transporting the target object 112 can be performed.

In another embodiment, the contact sensors 244 can further determine a vacuum force corresponding to the suction grippers 308. If the vacuum force is equal to or above the force threshold 322, the contact sensors 244 can register a non-zero reading associated with the suction grippers 308 and determine that the gripping unit 306 and the suction grippers 308 have a grip on the target object 112.

In one embodiment, if the suction grippers 308 lose grip, as determined by the contact sensors 244, such that the vacuum force, the linear force, or a combination thereof falls below the force threshold 322, the contact sensors 244 can determine zero or near-zero readings due to the failed grip. Further, due to the uneven distribution of the forces, a torque sensor associated with the gripping unit 306, the suction grippers 308, or a combination thereof can determine a non-zero reading.

In one embodiment, when the robotic system 100 determines there is failed grip of the suction grippers 308, the control unit 202, the communication unit, 212, the sensor unit 230, or a combination thereof can notify a user of the robotic system 100, other functional units of the robotic system 100, or a combination thereof, that there is a failed grip of the target object 112. As a result, the user or the functional units of the robotic system 100 can attempt to address the issue by determining the cause of the failure or attempt to re-calibrate, re-configure, or re-grip the target object 112.

In one embodiment, if all of the suction grippers 308 establish and maintain a grip or a vacuum condition with the target object 112, the linear force, the vacuum force, or a combination thereof can have a non-zero magnitude at all of the suction grippers 308, and deviations between the linear force, the vacuum force, or a combination thereof would be within a relatively small range. Further, since the weight would be distributed in a substantially even manner across the suction grippers 308, the torque measured at the gripping unit 306, the suction grippers 308, or a combination thereof would be closer to a zero value. Thus, the deviations in the linear force, the vacuum force, the torque readings, or a combination thereof can inversely represent the grip strength. As such, the robotic system 100 can use the above examples of the contact measure 320 as a representation of the grip of the gripping unit 306, the suction grippers 308, the suction cups 324, or a combination thereof on the target object 112.

In one embodiment, if some of the suction grippers 308, the suction cups 324, or a combination thereof fail to grip the target object 112, while other suction grippers 308, suction cups 324, or a combination thereof establish and maintain a grip or a vacuum condition with the target object 112, the contact sensors 244 can determine whether the grip from those instances of the suction grippers 308 maintaining a grip or a vacuum condition is sufficient, considering the linear force, the vacuum force, or a combination thereof, to maintain stability of the target object 112 to manipulate, transport, or otherwise perform the tasks 118 on the target object 112. For example, the contact sensors 244 can compare the weight of the object with the linear force, the vacuum force, the torque measured, or a combination thereof to the force threshold 322 to determine whether the linear force and the vacuum force are equal to or above the force threshold 322 while the torque measurement is at or near a zero reading, such that the target object 112 can be safely manipulated or transported.

Also, for example, the robotic system 100 can further use a lookup or translation table, a database, an equation, a process, or a combination thereof for translating or transposing the expected readings according to different orientations of the gripping unit 306 and the target object 112. In some embodiments, the master data 226, the configuration data 248, or a combination thereof, can include the expected readings for each of the different orientations of the gripping unit 306 and the target object 112. The robotic system 100 can use the expected readings to evaluate or process the contact measure 320 according to the orientation of the gripping unit 306 and the target object 112.

The suction grippers 308 can be implemented in accordance to a layout 302 along the distal end of the gripping unit 306. The layout 302 refers to the manner in which the suction grippers 308, suction cups 324, or a combination thereof are arranged. The layout 302 can be implemented in accordance to a variety of shapes and orientations, including lines, rectangles, circles, triangles, squares, or a combination thereof. For example, in one embodiment, the layout 302 can be implemented as a rectangular grid on the distal end of the gripping unit 306, where there are "x" number of the suction grippers 308 along a first direction 328 and "y" number of the suction grippers 308 along a perpendicular direction 332, perpendicular to the first direction 328. As a result, the suction grippers can form an "x" by "y" rectangle grid. As an example, in the embodiment shown in FIG. 3, the layout 302 is shown as a 2×2 square grid where there are 2 instances of the suction cups 324 along the first direction 328 and 2 suction cups 324 along the perpendicular direction 332. In other embodiments, the number of the suction cups 324 can be increased to vary the size of the square grid or to form a rectangular grid.

In another embodiment, the layout 302 can be implemented in a circle configuration where an equal number of the suction grippers 308 are placed equidistant from a center of the gripping unit 306. In another embodiment, the layout 302 can be implemented in a triangle configuration where the suction grippers 308 are positioned along the distal end of the gripping unit 306 along three straight sides where each line is at the angle 338 with the other two lines. The following are merely examples, and other layout 302 configurations can be used.

The suction grippers 308 can be controlled individually, as groups, as sub-groups, or all in unison based on the layout 302 as discussed above and the number of the suction grippers 308 used to grip the target object 112. The robotic system 100 can control the suction grippers 308 by controlling the actuation unit 220, vacuum hoses, vacuum generators, or a combination thereof. In one embodiment, the actuation unit 220, the vacuum hoses, the vacuum generators, or a combination thereof can be attached to each of the suction grippers 308 individually or to groups of suction grippers 308. The actuation unit 220, vacuum hoses, vacuum generators, or a combination thereof can cause the suction grippers 308 to perform their functions, for example causing mechanical movements of the suction grippers 308 to press down on the target object 112 to establish a grip, and to create the suction and vacuum conditions needed to maintain or establish the grip on the target object 112.

For example, in one embodiment, the robotic system 100 can control the actuation unit 220, the vacuum hoses, the vacuum generators, or a combination thereof by turning "on" or "off" the actuation unit 220, the vacuum hoses, the vacuum generators, or a combination thereof, and enabling the actuation unit 220, the vacuum hoses, the vacuum generators, or a combination thereof to press down on the target object 112, to establish a grip and to create suction and vacuum conditions needed to maintain or establish the grip on the target object 112. As a result, the robotic system 100 can control the precision by which the suction grippers 308 can grip the target object 112.

The suction grippers 308 can further be controlled based on the number of suction grippers 308 and the layout 302. For example, in one embodiment, the robotic system 100 can generate one or more grip patterns 330 to control the suction grippers 308 individually, as groups, as sub-groups, or all in unison, based on the number of suction grippers 308 and the layout 302. The grip patterns 330 refer to configurations of the suction grippers 308 that can be used to grip the target object 112. The grip patterns 330 can be used during an online state of the robotic system 100 to grip the target object 112 and to perform the tasks 118 of FIG. 1.

For example, in one embodiment, the grip patterns 330 can be represented as binary representation of an on/off state of each of the actuation unit 220, the vacuum hoses, vacuum generators, or a combination thereof. As a result, each state of the actuation unit 220, the vacuum hoses, the vacuum generators, or a combination thereof can be represented as either a "1" or "0" representing the "on" or "off" state. Based on the number of suction grippers 308 and the layout 302, the robotic system 100 can calculate a number of combinations of "on" and "off" states for the suction grippers 308 using the formula:

$$C=(S)^n \qquad (3)$$

In the above formula, "C" represents the number of combinations for the suction grippers 308, "S" represents the number of states for each of the actuation unit 220, the vacuum hoses, the vacuum generators, or a combination thereof, and "n" represents the number of suction grippers 308. As an example, where the suction grippers 308 are arranged as a 2×2 square, the robotic system 100 can compute $C=(2)^4$ or 16 variations of the grip patterns 330 for the suction grippers 308. In one embodiment, the grip patterns 330 can be represented as a lookup table 334. The lookup table 334 can be an array or matrix representation of the grip patterns 330. For example, the lookup table 334 can have the values of the grip patterns 330 represented as binary codes 336, for example, [1001], [0000], and [0001]. The binary codes 336 can represent which of the suction grippers 308 are turned "on" or "off." For example, in one embodiment, the one value of the binary codes 336 "[0000]" can indicate that all of the suction grippers 308 are turned "off"; whereas another value of the binary codes 336 "[1111]" can indicate that all the suction grippers 308 are turned on.

In one embodiment, the grip patterns 330 can be precomputed and stored as part of the configuration data 248, such that the robotic system 100 can be configured to have the number of the grip patterns 330 available for a particular instance of the layout 302 of the suction grippers 308. The grip patterns 330 can be used during the execution of the tasks 118 to grip the target objects 112. Further details regarding the manner in which the grip patterns 330 are used to grip the target object 112 will be discussed below.

Figure 4:
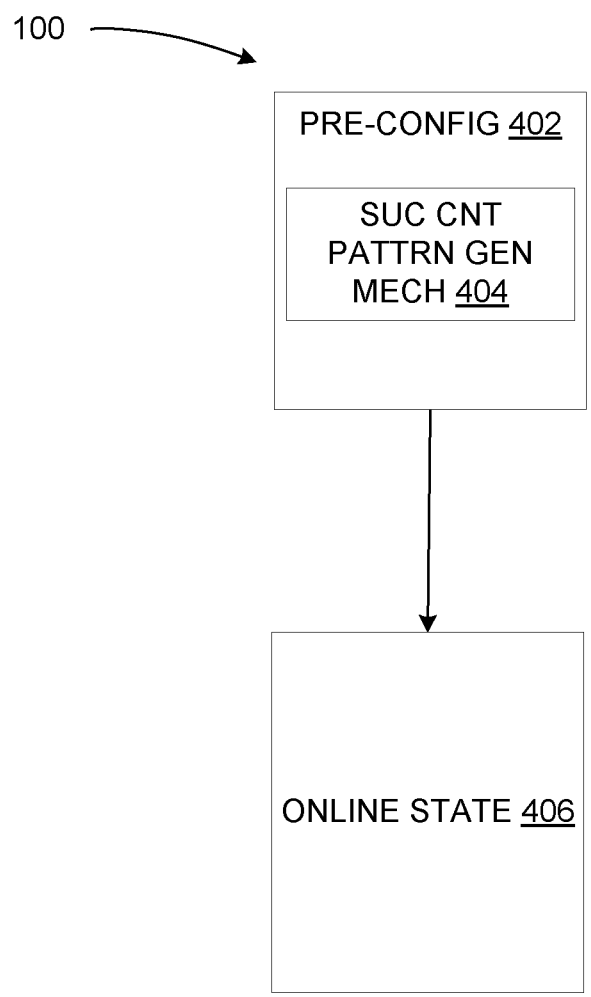
FIG. 4 is an exemplary control flow of the operational stages of the robotic system in an embodiment of the present invention.

Referring now to FIG. 4, therein is shown an exemplary control flow of the operational stages of the robotic system 100 in an embodiment of the present invention. In one embodiment, the robotic system 100 can be operated in two stages, including a pre-configuration state 402 and an online state 406. The embodiment shown in FIG. 4 assumes that the pre-configuration state 402 is performed prior to the robotic system 100 operating in the online state 406, however, this order of operation is merely exemplary and in other embodiments the pre-configuration state 402 can be performed in parallel or in real time with the online state 406. Real time refers to the instance where the robotic system 100 is used during a manufacturing, assembly, packing, packaging, warehousing, or shipping scenario, such that parameters, variable, the configuration data 248 of FIG. 2, or a combination thereof of the robotic system 100 is determined during the manufacturing, assembly, packing, packaging, warehousing, or shipping scenario.

The pre-configuration state 402 is a mode of operation, in which parameters, variables, the configuration data 248, or a combination thereof, of the robotic system 100 is determined. The parameters, variables, configurations, or a combination thereof can include any thresholds or settings, for example settings associated with the arm unit 102 of FIG. 1, the gripping unit 306, the suction grippers 308, the sensor unit 230, or a combination thereof, necessary to perform the tasks 118 of FIG. 1 on the target object 112 of FIG. 1.

For example, in one embodiment, the pre-configuration state 402 can include a suction control pattern generating mechanism 404. The suction control pattern generating mechanism 404 can, for example, determine parameters, variables, the configuration data 248, or a combination thereof, associated with the gripping unit 306 of FIG. 3, the suction grippers 308 of FIG. 3, the sensor unit 230 of FIG. 2, or a combination thereof. The robotic system 100 can implement the suction control pattern generating mechanism 404 using the various functional units of FIGS. 2 and 3 of the robotic system 100, one or more external components to the robotic system 100, or a combination thereof. External components refer to components external to the robotic system 100. Further details of the implementation of the suction control pattern generating mechanism 404 will be discussed below.

The online state 406 is a mode of operation in which the robotic system 100 is used during a manufacturing, assembly, packing, packaging, warehousing, or shipping scenario, when the robotic system 100 is performing the tasks 118 on the target object 112. During the online state 406, the robotic system 100 can use the parameters, variables, the configuration data 248, or a combination thereof, of the robotic system 100 as determined during the pre-configuration state 402 to perform tasks 118 on the target object 112. Further details of the implementation of the online state 406 will be discussed below.

The pre-configuration state 402 and the online state 406 can be implemented based on executing the software 210 of FIG. 2 or a set of instructions stored in the storage unit 206 of FIG. 2, which can be executed by the control unit 202 of FIG. 2, other functional units of the robotic system 100, or a combination thereof.

Figure 5:
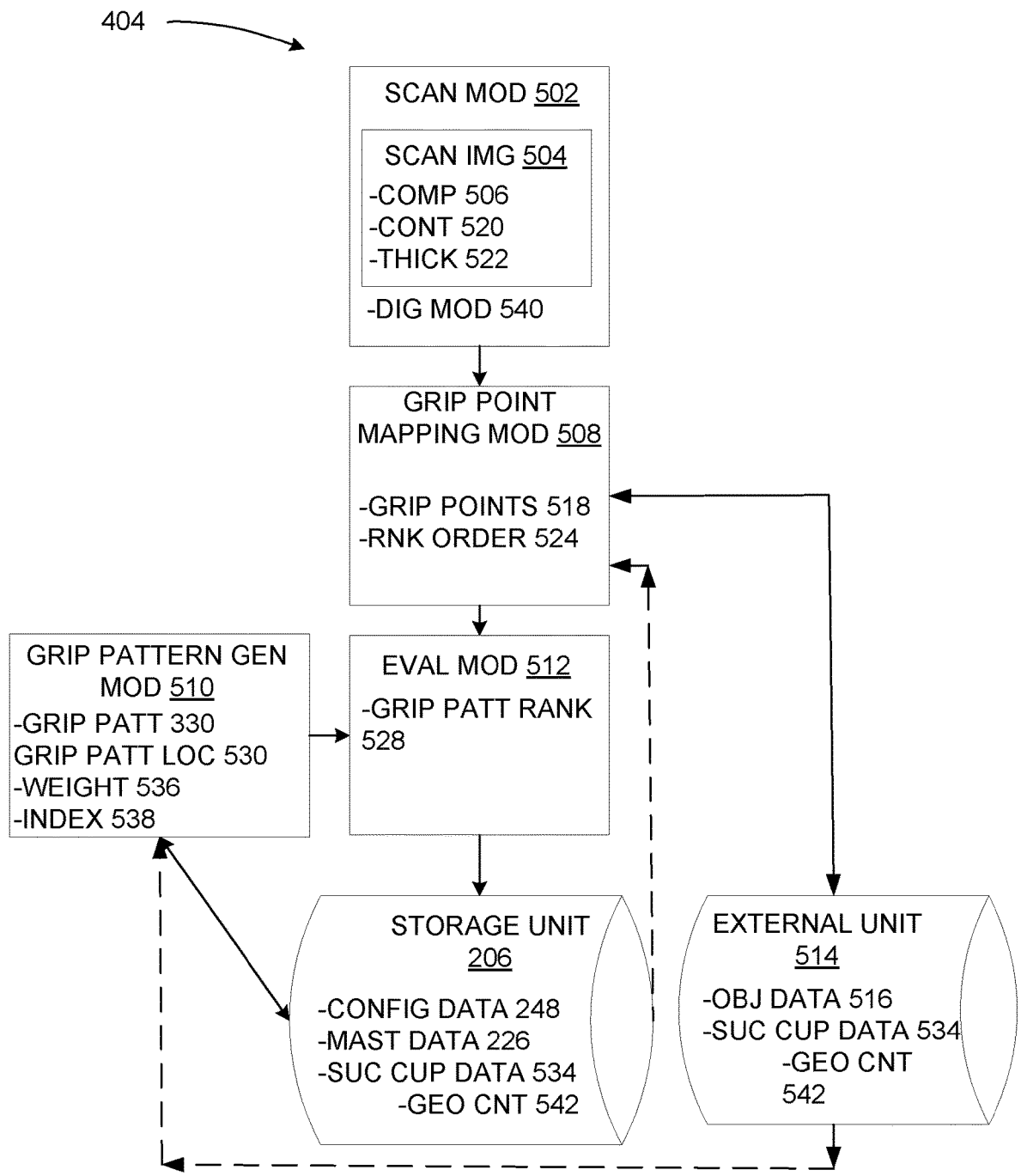
FIG. 5 is an exemplary control flow of a suction control pattern generating mechanism in an embodiment of the present invention.

Referring now to FIG. 5, therein is shown an exemplary control flow of a suction control pattern generating mechanism 404 in an embodiment of the present invention. The robotic system 100 can implement the suction control pattern generating mechanism 404 using the various functional units of FIGS. 2 and 3 of the robotic system 100 of FIG. 1, one or more external components to the robotic system 100, or a combination thereof.

In one embodiment, the suction control pattern generating mechanism 404 can be configured to generate the grip patterns 330. The suction control pattern generating mechanism 404 can further be configured to recognize the target object 112 of FIG. 1 and test one or more locations of grip points 518 associated with the target object 112 prior to the robotic system 100 encountering the target object 112 in the online state 406 of FIG. 4. By testing the one or more location of the grip points 518, the suction control pattern generating mechanism 404 can determine how to handle the target object 112 during the online state 406. The suction control pattern generating mechanism 404 can be further configured to determine which of the grip patterns 330 should be used on the target object 112 based on the grip points 518. The grip points 518 refer to areas on the surfaces of the target object 112 that are capable of being gripped by the suction grippers 308 of FIG. 3, the suction cups 324 of FIG. 3, or a combination thereof.

In one embodiment, the suction control pattern generating mechanism 404 can be implemented using a grip pattern generating module 510, a scan module 502, a grip point mapping module 508, an external unit 514, an evaluation module 512, and the storage unit 206. In one embodiment, the scan module 502 can be coupled to the grip point mapping module 508. The grip point mapping module 508 can be coupled to the evaluation module 512, optionally to the storage unit 206, and to the external unit 514. The evaluation module 512 can be coupled to the grip pattern generating module 510 and the storage unit 206. The grip pattern generating module 510 can be coupled to the storage unit 206 and optionally the external unit 514.

The grip pattern generating module 510 can enable the generation of the grip patterns 330 in the manner described with respect to FIG. 3. The grip pattern generating module 510 can further enable the generation of a grip pattern location 530. The grip pattern location 530 refers to a position on the layout 302 of FIG. 3 where an even distribution of force can be applied to the target object 112 by the suction grippers 308. The target object 112 can be gripped using the grip pattern location 530. The grip pattern location 530 can vary based on a number of variables including, the grip patterns 330, physical properties of the suction cups 324, or a combination thereof. In one embodiment, the grip pattern location 530 can be determined based on the layout 302 of the grip patterns 330 and a suction cup data 534.

The suction cup data 534 refers to the variables, parameters, thresholds, or a combination thereof, that can characterize the physical properties of the suction cups 324. For example, the suction cup data 532 can include data regarding a maximum weight that can be held by one or more suction cups 324, a flexibility measure, a tensile strength, a friction coefficient, a size, or a combination thereof, for the suction cups 324. The suction cup data 534 can be known to the robotic system 100 and can be stored in the storage unit 206, the external unit 514, or a combination thereof.

The external unit 514 refers to a storage external to the robotic system 100. Similar to the storage unit 206, the external unit 514 can be a volatile memory, a nonvolatile memory, an internal memory, an external memory, or a combination thereof. For example, the external unit 514 can be a nonvolatile storage such as non-volatile random access memory (NVRAM), Flash memory, disk storage, or a volatile storage such as static random access memory (SRAM). In another embodiment, the external unit 514 can be a database or a lookup table.

Continuing with the example, in the embodiment where the grip pattern location 530 is determined based on the grip patterns 330 and the suction cup data 534, the grip pattern location 530 can be specifically determined based on the amount of weight the suction cup 324 can hold and the position of the suction cup 324 in the layout 302. The grip pattern generating module 510 can determine the grip pattern location 530 by obtaining a variable, parameter, or a combination thereof indicating the maximum weight that can be held by one or more suction cups 324. Based on the maximum weight, the grip pattern generation module 510 can set a geometric center 542 of the suction cup 324 as the default position the suction cup 324 can most evenly distribute the maximum weight. In a configuration of the grip patterns 330 where only one suction cup 324 is to be turned "on" to grip the target object 112, the grip pattern generation module 510 can assign the geometric center 542 of the suction cup 324 to be the grip pattern location 530. The geometric center 542 refers to the mean position of all the points of the suction cup 324 in all of the coordinate directions.

In an embodiment, where multiple instances of the suction grippers 308 are used to grip the target object 112, the grip pattern generating module 510 can determine the grip pattern location 530 based on a weighted average considering the geometric center 542 of the suction cups 324 and a weight factor 536. The weight factor 536 refers to a parameter assigned by the grip pattern generation module 510 to the suction cups 324 based the amount of force which the suction cups 324 can exert on the target object 112. The weight factor 536 can be pre-determined by a user of the robotic system 100.

For example, in one embodiment, the more weight that the suction cups 324 can hold, the bigger the weight factor 536 assigned to the suction cups 324. In another embodiment, the larger the surface area that the suction cups 324 can cover, the bigger the weight factor 536 assigned to the suction cups 324. As a result, the grip pattern generating module 510 can compute the grip pattern location 530 based on which of the suction cups 324 apply the most force to the target object 112, and can position the grip pattern location 530 closer to the instances of the suction cups 324 in a scenario with multiple instances of the suction cups 324.

As an example, in the embodiment where the layout 302 is a 2×2 square grid and where all the suction cups 324 can hold the same maximum weight and are the same size, the grip pattern location 530 can be determined to be the point at the center of the square grid equidistant to each of the four sides of the square. As another example, where the layout 302 is a 2×2 square grid and the suction cups 324 vary in size, but can hold the same maximum weight, the grip pattern location 530 can assign the grip pattern location 530 to be a point closer to the larger sizes of the suction cups 324. As a result, the robotic system 100 can distribute force on the target object 112 in an even or close to even manner.

It has been discovered that gripping the target object 112 based on the grip pattern location 530 provides the most stable means for gripping the target object 112 because gripping the target object 112 at the grip pattern location 530 provides for the most even distribution of force across the target object 112. It has further been discovered that gripping the target object 112 based on the grip pattern location 530 while performing the tasks 118 on the target object 112 leads to less drops of the target object 112.

In one embodiment, the grip pattern generating module 510 can generate the grip pattern location 530 for each of the grip patterns 330. As a result, the grip pattern generating module 510 can create an index 538 of the grip patterns 330 and associated instance of the grip pattern location 530. The index 538 refers to an array, lookup table, or a combination of the grip patterns 330 and associated instance of the grip pattern location 530. In one embodiment, once the grip patterns 330, the grip pattern location 530, and the index 538 are generated, they can be passed to the evaluation module 512 to be further processed. Further details of the evaluation module 512 will be discussed below.

The scan module 502 can enable the sensor unit 230 of FIG. 2, including one or more imaging devices, for example, two-dimensional (2D) cameras, three-dimensional (3D) cameras, infrared cameras, lidars, radars, other distance-measuring or imaging devices, or a combination thereof to perform scanning or imaging functions. For example, the scan module 502 can be configured to detect the surrounding environment of the target object 112, to take a scan image 504, including the digital image, the point cloud/depth view, or a combination thereof to identify the target object 112, the grip points 518 of the target object 112, or a combination thereof. The scan image 504 can be used to generate a digital model 540 of the target object 112 that can be used in determining where to grip the target object 112.

The digital model 540 is a computer representation of the physical characteristics of the scanned environment, including the physical characteristics of the target object 112. The digital model 540 can simulate the target object 112. The digital model 540 can be represented as a computer file, a format, a data structure, or a combination thereof.

In one embodiment, the target object 112 can be, for example, an object not encountered by or unknown to the robotic system 100, and thus, have the physical characteristics of the target object 112 unknown to the robotic system 100. Physical characteristics can include shapes, sizes, dimensions, thicknesses 522, a composition 506, surface contours 520, or a combination thereof.

The scan module 502 can, by enabling the imaging of the target object 112, allow the sensor unit 230 to generate the sensor readings 246 of FIG. 2 regarding the physical characteristics of the target object 112, including the physical dimensions, the shape, the height, the width, the depth, or a combination thereof, of the target object 112. These sensor readings 246 can be represented in the scan image 504.

In a further embodiment, the scan module 502 can, in conjunction with the sensor unit 230 and other external devices, including an x-ray machine or a spectrometer, generate the scan image 504 further indicating the composition 506 of the target object 112, such that the scan image 504 can include details regarding the composition 506 of the target object 112. The composition 506 refers to the physical makeup, the chemical makeup, or a combination thereof of the target object 112. The robotic system 100 can determine the force or grip that can be applied by the suction grippers 308 at the grip points 518 identified based on the composition 506 of the target object 112, such that a proportionate amount of force can be applied at the grip points 518 so as to not damage the target object 112 during the tasks 118 or to select the grip points 518 where the target object 112 can be gripped. The identification of the composition 506 can further be used to determine locations where the target object 112 cannot be gripped.

For example, if the composition 506 of a surface of the target object 112 is identified such that the material that makes up that surface can only withstand force up to the force threshold 322 of FIG. 3 before experiencing irreversible plastic deformation or breaking, the robotic system 100 can determine whether or not to use that location of the grip points 518 or identify a further location of the grip points 518 so as to not damage the target object 112. The robotic system 100 can also, for example, adjust the force or vacuum condition applied to the grip points 518 based on identifying the composition 506. For example, in one embodiment, if the composition 506 of a surface of the target object 112 is identified such that the material that makes up that surface can only withstand force up to the force threshold 322 before experiencing irreversible plastic deformation or breaking, the robotic system 100 can determine to adjust the force applied by the actuation unit 220 or the vacuum conditions such that the force is below the force threshold 322. In one embodiment, once generated, the scan module 502 can pass the scan image 504, the digital model 540, or a combination thereof to the grip point mapping module 508 for further processing.

The grip point mapping module 508 can enable the identification of the grip points 518 for the target object 112 based on the scan image 504, the digital model 540, or a combination thereof. The grip point mapping module 508 can identify the grip points 518 by processing the scan image 504 and performing analytics based on an object data 516. The object data 516 refers to data representing known physics of objects or shapes, known properties of materials, or a combination thereof. For example, the object data 516 can include equations associated with objects or shapes, known properties such as, known atomic structure, known nanostructure, known microstructure, known macrostructure, known bonding properties, known kinetics, known crystallography, known mechanical properties, or a combination thereof of objects or shapes. In one embodiment, the object data 516 can be stored in the external unit 514. The grip point mapping module 508 can communicate with the external unit 514 via the communication unit 212, to retrieve the object data 516. In another embodiment, the object data 516 can be stored in the storage unit 206, as part of the master data 226 of the robotic system 100.

In one embodiment, the grip point mapping module 508 can perform analytics by, for example, determining the geometric shape indicated by the scan image 504, the digital model 540, or a combination thereof, by comparing the shape in the scan image 504, the digital model 540, or a combination thereof, to a set of known shapes which can be part of the object data 516. Based on the comparison, if a geometric shape is recognized by the grip point mapping module 508, as being a match or a close match to the shape of the target object 112, the grip point mapping module 508 can perform analytics based on the object data 516 associated with the matched geometric shape or object.

The grip point mapping module 508 can determine physical characteristics for the geometric shape, for example, calculate a surface area, the center of mass 236 of FIG. 2, or a combination thereof for the geometric shape based on equations for determining the surface area for the object or shape. Based on the physical characteristics for the geometric shape, the grip point mapping module 508 can determine the grip points 518 for the target object 112.

In one embodiment, the grip point mapping module 508 can determine the grip points 518 based on the center of mass 236 (which can also be an estimate of the center of mass 236). The grip point mapping module 508 can identify the grip points 518 for the target object 112 as points on a surface close to the center of mass 236 of the target object 112. As a result, the grip point mapping module 508 can ensure that the target object 112 is gripped where there is an even distribution of mass.

In an embodiment, the grip point mapping module 508 can further consider other factors, in addition to the center of mass 236 to identify the grip points 518. For example, in one embodiment, the grip point mapping module 508 can further consider the surface contours 520 including the flatness or curvature of the surfaces of the target object 112, the thickness 522 of the surfaces of the target object 112, the composition 506 of the surfaces of the target object 112, the surface area of the target object 112, or a combination thereof to identify the grip points 518.

For example, in one embodiment, the grip point mapping module 508 can identify the center of mass 236 for the target object 112. Further, the grip point mapping module 508 can also determine that the particular surface closest to the center of mass 236 does not have a flat enough surface, for example the surface has a curvature or unevenness, such that the suction grippers 308 cannot grip the grip points 518 associated with that surface, or that the surface area is too small to be gripped by the suction grippers 308. Thus, the grip point mapping module 508 can further identify one or more further locations of the grip points 518 on surfaces close to the center of mass 236 where the suction grippers 308 can grip the target object 112. Such further location can be, for example, at the corners of the target object 112 or "corner grips", on the sides of the target object 112, or along any other surface along the target object 112. As a result, the grip point mapping module 508 can attempt to identify the closest point to the center of mass 236 such that gripping can be accomplished but if it cannot be accomplished at that point, determine different locations for the grip points 518 such as those along the corners of the target object 112 to grip the target object 112.

In another embodiment, the grip point mapping module 508 can further consider the composition 506 of the surfaces of the target object 112, as determined by the scan image 504, the digital model 540, or a combination thereof, and the known material properties of objects. For example, in one embodiment, if the grip points 518 are identified to be on a surface of the target object 112 where the surface is made of a material that is fragile and cannot have a force applied to it greater than the force threshold 322 before breaking, the grip point mapping module 508 can determine whether to use the grip points 518 or further identify other locations of the grip points 518 close to the center of mass 236 where the suction grippers 308 can grip the target object 112. Such further location can be, for example, at the corners of the target object 112 or "corner grips," on the sides of the target object 112, or along any other surface along the target object 112.

In one embodiment, if the grip point mapping module 708 cannot find a match for the target object 112 based on the comparison of the scan image 504, the digital model 540, or a combination thereof to a set of known shapes or objects, a user of the robotic system 100 can further assist in identifying the grip points 518 by setting grip points 518 for the target object 112. The user of the robotic system 100 can designate the grip points 518 by analyzing the scan image 504, the digital model 540, or a combination thereof, using the user interface 216 of FIG. 2, for example on the display interface 218, and determine which positions would be the best positions for the suction grippers 308 to grip the target object 112. In one embodiment, the user of the robotic system 100 can set the grip points 518 using the input devices of the user interface 216.

In one embodiment, the grip point mapping module 508 can further generate a ranked order 524 of the grip points 518. The ranked order 524 can be an array, lookup table, or a combination thereof that indicates the most preferable locations of the grip points 518 to grip the target object 112. The grip points 518 can be ranked from most to least preferable based on a number of factors including, distance from the center of mass 236, the composition 506 of the surface of the target object 112, the surface area available to be gripped by the gripping unit 306, or a combination thereof.

For example, in one embodiment, the grip points 518 closer to the center of mass 236 can be given a higher ranking in the ranked order 524 because the grip points 518 are most stable to grip the target object 112 where there are even distributions of mass of the target object 112. However, if the grip point mapping module 508 can determine that the grip points 518 identified along a surface of the target object 112 close to the center of mass 236 cannot be used because, for example, the surface area is too small, the suction grippers 308 cannot grip at the angle 338, the composition 506 of the surface is too fragile to be gripped by the suction grippers 308 because the suction grippers 308 will apply a force greater than the force threshold 322 such that it will break the surface of the target object 112, or a combination thereof, the grip point mapping module 508 can assign the grip points 518 having a lower ranking in the ranked order 524. More specifically as an example, the grip point mapping module 508 can determine what other locations of the grip points 518 can be identified to grip the target object 112 and give the other locations of the grip points 518 a higher ranking in the ranked order 524. Such further location can be for example, at the corners of the target object 112 or "corner grips", on the sides of the target object 112, or along any other surface along the target object 112.

As a result, the grip point mapping module 508 can determine the most preferable instance of the grip points 518 for a given instance of the target object 112. In another embodiment, a user of the robotic system 100 can determine the ranked order 524 by overriding the one or more rankings determined by the grip point mapping module 508. In another embodiment, the user can set the ranked order 524 of the grip points 518.

It has been discovered that identifying the grip points 518 in the manner described above, generating the ranked order 524, or a combination thereof can provide the robotic system 100 a list of preferable locations of the grip points 518 at which to grip the target object 112. Further, the ranked order 524 can provide the robotic system 100 with multiple fall back grip points for gripping the target object 112 such that the robotic system 100 can grip the target object 112 regardless of the orientation or environmental conditions of the target object 112.

In one embodiment, once the grip points 518 are determined, the grip points 518, the ranked order 524, or a combination thereof can be passed to the evaluation module 512. The evaluation module 512 can enable the mapping of the grip points 518 to the grip patterns 330 to determine a grip pattern rank 528. The grip pattern rank 528 can be an array, lookup table, or a combination thereof that indicates the order in which configuration of the grip patterns 330 should be used to grip the target object 112.

The evaluation module 512 enables the mapping of the grip points 518 to the grip patterns 330, the determination of the grip pattern rank 528, or a combination thereof in a variety of ways. For example, in one embodiment, the evaluation module 512 can determine whether the grip points 518 can be gripped by a particular configuration of the grip patterns 330 by aligning the grip points 518 to the grip pattern location 530 for each of the grip patterns 330. For another example, the evaluation module 512 can determine whether there are instances of the grip patterns 330 associated with the grip pattern location 530 for using all or most of the suction grippers 308, suction cups 324, or a combination thereof to grip the target object 112. For example, if the evaluation module 512 determines that not all of the suction grippers 308 can be used to grip the target object 112 at a particular instance of the grip points 518, the evaluation module 512 can assign a lower value for the grip pattern rank 528 to the particular configuration of the grip patterns 330 for the particular locations of the grip points 518 and look for other instances of the grip patterns 330 that can be used to grip the target object 112 at the particular locations of the grip points 518. However, if the evaluation module 512 determines that one or more instances of the grip patterns 330 can be used to grip the target object 112 at the particular locations of the grip points 518, the evaluation module 512 can assign the grip patterns 330 having a higher value of the grip pattern rank 528 for gripping at the particular locations of the grip points 518.

In another embodiment, the evaluation module 512 can determine the grip pattern rank 528 based on the suction grippers 308 having suction cups 324 that are able to grip the target object 112. For example, in an embodiment where multiple instances of the suction grippers 308 can be used to grip the target object 112. For further example, the suction grippers 308 have two or more different instances of the suction cups 324. More specifically as an example, the suction cups 324 can be made out of different materials, have different sizes, or a combination thereof, which can affect the ability of the suction cups 324 to grip the target object 112. The evaluation module 512 can assign a lower value for the grip pattern rank 528 to the grip patterns 330 that use the suction cups 324 that are less well suited to grip the target object 112 (e.g., cannot bear the weight of the target object 112).

In another embodiment, the evaluation module 512 can determine the grip pattern rank 528 based on a user preference. For example, the user of the robotic system 100 can set which instances of the grip patterns 330, which instances of the suction grippers 308, or a combination thereof that can be used when gripping the target object 112. The evaluation module 512 can assign a higher value for the grip pattern rank 528 to those instances of the grip patterns 330 that are preferred by the user.

Based on the mapping, the evaluation module 512 can determine the grip pattern rank 528 for all of the grip points 518 and associated instances of the grip patterns 330. In one embodiment, once the grip pattern rank 528 is generated, the grip pattern rank 528 can be saved in the storage unit 206. The grip pattern rank 528 can be used by the robotic system 100 in the online state 406 to grip the target object 112.

It has been discovered that the robotic system 100 implementing the suction control pattern generating mechanism 404 as described herein allows for increased control when gripping the target object 112, because the grip pattern rank 528 generated provides a list of optimal instances of the grip points 518 and the grip patterns 330 by which to grip the target object 112. It has been further discovered that increased control leads to less drops when gripping the target object 112.

It has been further discovered that the robotic system 100 implementing the suction control pattern generating mechanism 404 described herein provides the robotic system 100 with greater configurability and customization based on the ability of the robotic system 100 to generate individualized configuration of the gripping patterns 330 for each instance of the target object 112 identified such that the target object 112 can be gripped according to its individual physical characteristics.

It has been further discovered that the robotic system 100 implementing the suction control pattern generating mechanism 404 described herein provides the robotic system 100 higher probability of gripping the target object 112 based on the ability to generate customized configurations of the grip patterns 330, such that the robotic system 100 has several options to grip the target object 112.

The suction control pattern generating mechanism 404 has been described with module functions or order as an example. The robotic system 100 can partition the modules differently or order the modules differently. For example, the software 210 can include the modules for the suction control pattern generating mechanism 404. As a specific example, the software 210 can include the grip pattern generating module 510, the scan module 502, the grip point mapping module 508, the evaluation module 512, and associated sub-modules included therein.

The control unit 202 of FIG. 2 can execute the software 210 to operate the modules. For example, the control unit 202 can execute the software 210 to implement the grip pattern generating module 510, the scan module 502, the grip point mapping module 508, the evaluation module 512, and associated sub-modules included therein.

The modules described in this application can be implemented as instructions stored on a non-transitory computer readable medium to be executed by the control unit 202. The non-transitory computer readable medium can include the storage unit 206. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the robotic system 100 or installed as a removable portion of the robotic system 100.

Figure 6:
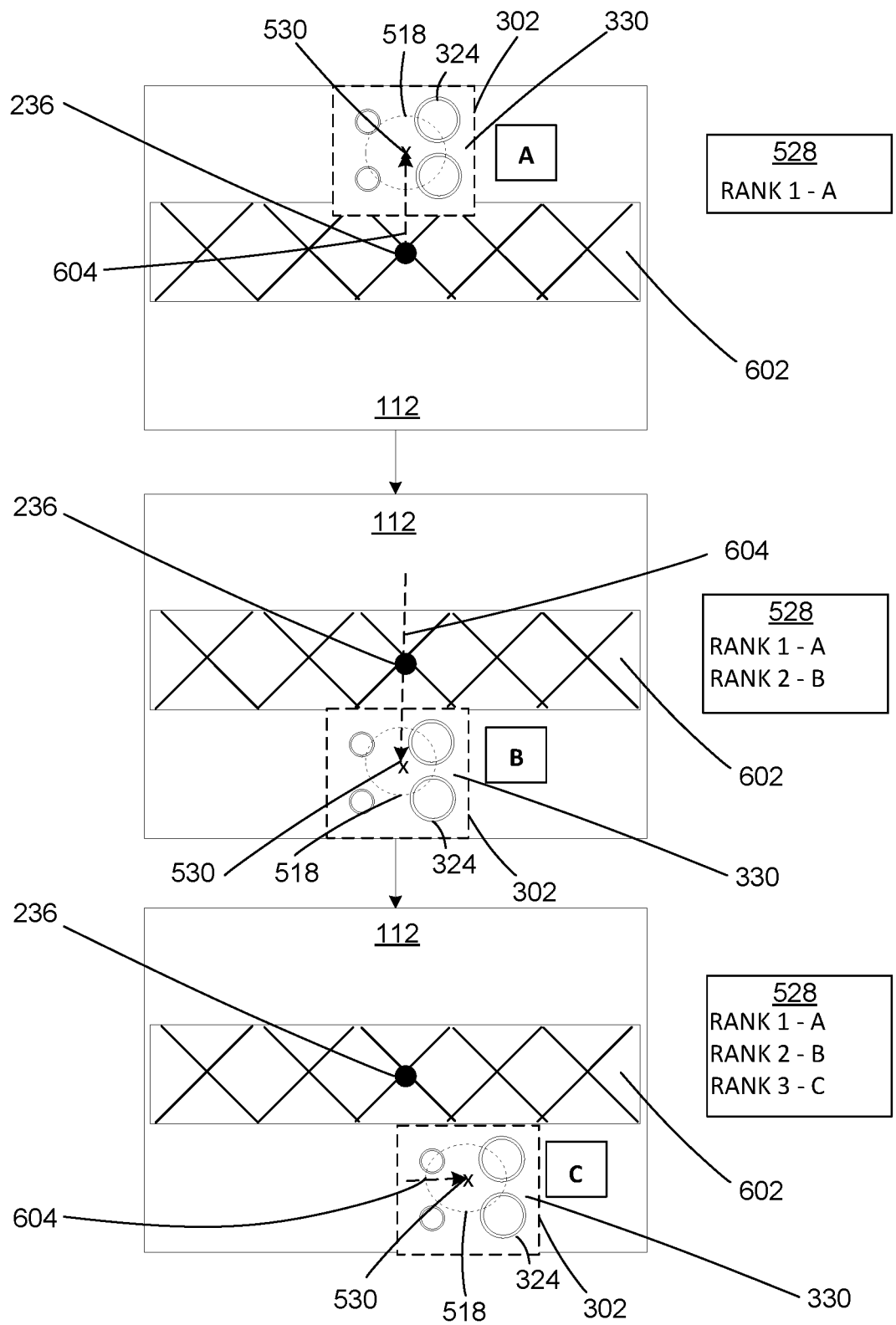
FIG. 6 is an example of the mapping of grip points to the grip patterns in accordance with one or more embodiments of the present invention.

Referring now to FIG. 6, therein is shown an example of the mapping of the grip points 518 to the grip patterns 330 in accordance with one or more embodiments of the present invention. FIG. 6 depicts an embodiment in which the evaluation module 512 of FIG. 5 determines whether the grip points 518 can be gripped by a particular configuration of the grip patterns 330 by aligning the grip points 518 to the grip pattern location 530 for each of the grip patterns 330, and determining whether there exist grip patterns 330 associated with the grip pattern location 530 that can use all or most of the suction grippers 308, suction cups 324, or a combination thereof to grip the target object 112. FIG. 6 further depicts an embodiment in which the layout 302 is a 2×2 square and the suction cups 324 are of varying size. The depiction in FIG. 6 is merely for convenience of description. Other examples of the layouts 302 and grip patterns 330 can be used.

As shown in FIG. 6, the mapping can begin by attempting to grip the target object 112 at the center of mass 236 of the target object 112. If the center of mass 236 is located at a prohibited region 602, for example a point or area on the surface of the target object 112 that cannot be gripped, because the composition 506 of the material that makes up that surface is too fragile to be gripped, as compared to a baseline, or for any other reason as described with respect to FIG. 5, the evaluation module 512 can determine the grip points 518 along the surface of the target object 112 away from the center of mass 236, such that the target object 112 can be gripped according to the layout 302 and the grip patterns 330. The evaluation module 512 can determine an offset 604 to align the grip pattern location 530 to the grip points 518 away from the center of mass 236 of the target object 112 which can potentially be gripped. The offset 604 refers to a distance by which the evaluation module 512 moves the grip pattern location 530 away from the center of mass 236. For example, in FIG. 6 the evaluation module 512 can determine the grip pattern location 530 to be at a position "A," which is determined to be a potential location for one or more of the grip points 518 that can be gripped. The evaluation module 512 can test one or more of the grip points 518 to determine if the grip points 518 can be gripped according to the grip patterns 330. If one or more of the grip points 518 can be gripped according to the grip patterns 330, the evaluation module 512 can assign the position "A" as the grip pattern rank 528 that is one of the preferable instances of the grip patterns 330 to grip the target object 112.

In one embodiment, the evaluation module 512 can further determine for other instances of the grip points 518 that can be gripped. For example, the evaluation module 512 can again determine the offset 604 to move the grip pattern location 530 to another location of the grip points 518, and determine if the grip points 518 can be gripped. For example, in FIG. 6, the grip points 518 are depicted as position "B." Again, if the grip points 518 at position "B" can be gripped, the evaluation module 512 can assign the position "B" at the grip pattern rank 528 that is one of the other preferable instances of the grip patterns 330 to grip the target object 112. In one embodiment, the evaluation module 512 can continue determining for the grip points 518 that can be gripped in the same manner as described. For example, the evaluation module 512 can determine the offset 604 to move the grip pattern location 530 to another location of the grip points 518, for example, at position "C." If the grip points 518 can be gripped, the evaluation module 512 can assign the position "C" at the grip pattern rank 528 that is one of the other preferable instances of the grip patterns 330 to grip the target object 112.

In one embodiment, if the evaluation module 512 determines that any of the grip points 518 cannot be gripped, for example, the grip points 518 falls within the prohibited region 602, the evaluation module 512 can disregard the grip points 518 and not include the grip points 518 in the grip pattern rank 528.

Figure 7:
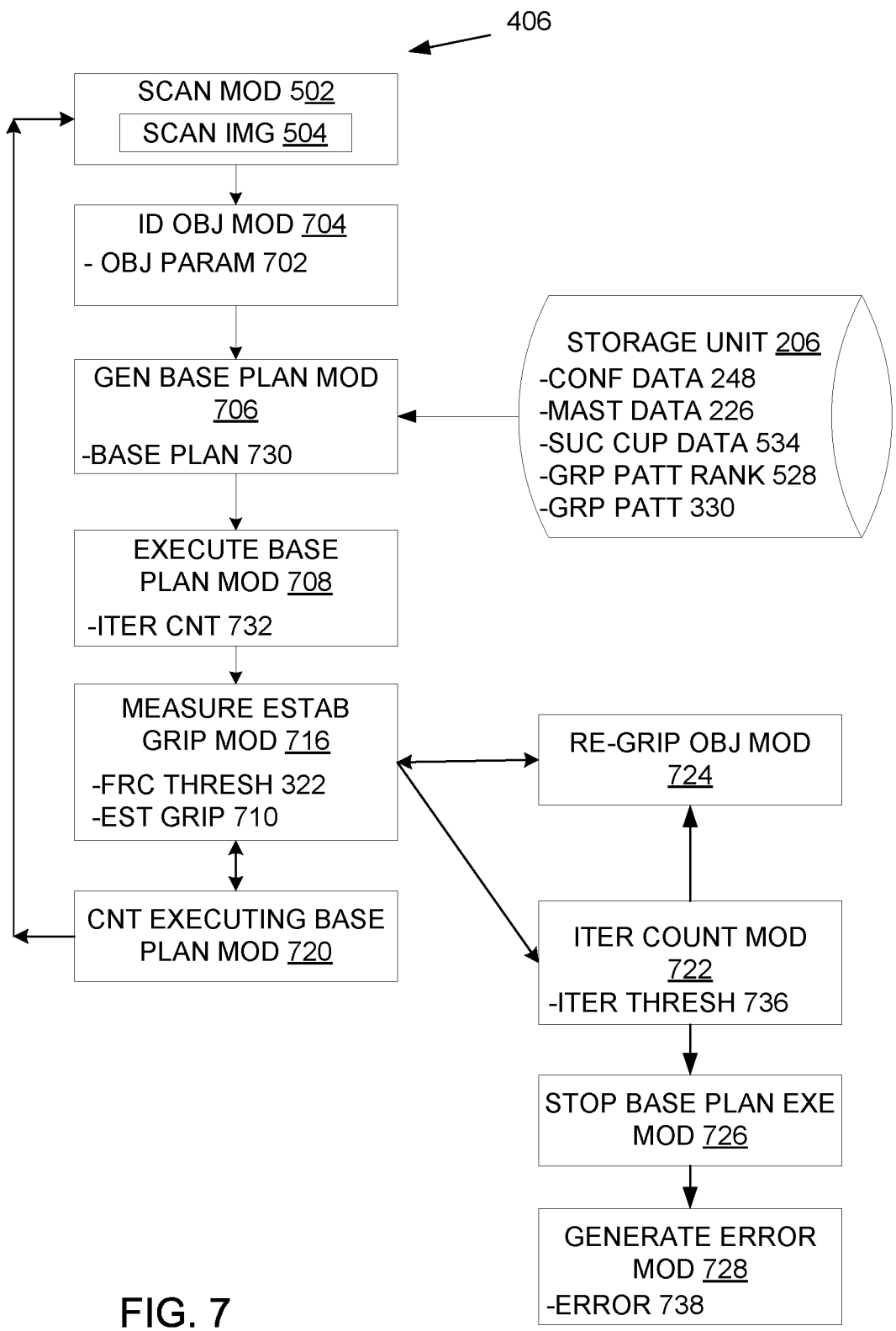
FIG. 7 is an exemplary control flow of the online state of the robotic system in an embodiment of the present invention.

Referring now to FIG. 7, therein is shown an exemplary control flow of the online state 406 of the robotic system 100 of FIG. 1 in an embodiment of the present invention. In the embodiment shown in FIG. 7, the suction control pattern generating mechanism 404 of FIGS. 4 and 5 can be executed such that the grip patterns 330 of FIGS. 3 and 5, the grip the grip points 518 of FIG. 5, the grip pattern rank 528 of FIG. 5 for a variety of the target objects 112 of FIG. 1, or a combination thereof can be known to the robotic system 100, and stored in the storage unit 206 of FIG. 2 as part of the master data 226 of FIG. 2.

The robotic system 100 can implement the online state 406 using the various functional units of FIGS. 2, 3, and 4 of the robotic system 100, one or more external components to the robotic system 100, or a combination thereof. In one embodiment, the online state 406 can be implemented using the scan module 502, an identify object module 704, a generate base plan module 706, an execute base plan module 708, a measure established grip module 716, a continue executing base plan module 720, an iteration count module 722, a re-grip object module 724, a stop base plan execution module 726, the storage unit 206, a generate error module 728, or a combination thereof.

In one embodiment, the scan module 502 can be coupled to the identify object module 704. The identify object module 704 can be coupled to the generate base plan module 706. The generate base plan module 706 can be coupled to the execute base plan module 708 and the storage unit 206. The execute base plan module 708 can be coupled to the measure established grip module 716. The measure established grip module 716 can be coupled the re-grip object module 724, the continue executing base plan module 720, and the iteration count module 722. The continue executing base plan module 720 can be coupled to the scan module 502. The iteration count module 722 can be coupled to the re-grip object module 724 and the stop base plan execution module 726. The stop base plan execution module 726 can be coupled to the generate error module 728.

The scan module 502, similar to what was described with respect to FIG. 5, can enable the sensor unit 230 of FIG. 2, including one or more imaging devices, for example, two-dimensional (2D) cameras, three-dimensional (3D) cameras, infrared cameras, lidars, radars, other distance-measuring or imaging devices, or a combination thereof to perform scanning or imaging functions. The scan module 502 can enable the scan of the designated areas 114 of FIG. 1 or the task locations 116 of FIG. 1 for the target object 112. The scan can be done using similar techniques as was described with respect to FIG. 5. And similar outputs can be generated from the execution of the scan module 502, including the generation of the sensor readings 246 of FIG. 2, for example the scan image 504. The scan image 504 can be used to identify or recognize the target object 112 in the online state 406. For example, the scan module 502 can use the sensor unit 230 to generate the scan image 504, for example such as a digital image, the point cloud/depth view, or a combination thereof of the target object 112 in a bin, a pallet, a box, a conveyor belt, a truck, or a combination thereof. In one embodiment, the scan image 504 can be used to generate the digital model 540 of FIG. 5 of the target object 112 that can be used by further components of the robotic system 100 to identify the target object 112. In one embodiment, once the scan is performed, the sensor readings 246, for example the scan image 504, the digital model 540, or a combination thereof, and control can be passed to the identify object module 704.

The identify object module 704 can enable the identification of the target object 112 based on the sensor readings 246 received, for example the scan image 504. The identify object module 704 can recognize the target object 112 in a process similar to that described with respect to FIG. 5 and the grip point mapping module 508, such as by determining geometric shapes in the scan image 504 and comparing them to a set of known shapes or objects. Based on the comparison, the target object 112 can be mapped to a geometric shape or known object. If a match is found, the identify object module 704 can generate an object parameter 702 indicating what known object or geometric shape the target object 112 is recognized. The object parameter 702 can be a variable, flag, or combination thereof that can be assigned by the identify object module 704 to map the target object 112 to the known object or geometric shape. For example, if the identify object module 704 recognizes the target object 112 to be a "box," the object parameter 702 can be set or assigned to "box," such that the further components of the robotic system 100 can know that the target object 112 is a "box."

In another embodiment, the identify object module 704 can recognize the target object 112 by searching for tags or labels known to the robotic system 100, that can identify the target object 112. For example, the tags or labels can include bar codes, quick response (QR) codes, logos, or a combination thereof, that can identify the target object 112. The tags or labels can be mapped or associated with objects and known to the robotic system 100. The tags or labels can be scanned as part of the scanning operation of the scan module 502, and can be included as a part of the scan image 504, the digital model 540, or a combination thereof. Similar to what was described with respect to FIG. 5, if a match is found, the identify object module 704 can generate the object parameter 702 indicating what object or geometric shape the target object 112 is recognized as, and set or assign the object parameter 702 in the same manner described above.

In one embodiment, once the identify object module 704 recognizes the target object 112, the identify object module 704 can pass the object parameter 702, the scan image 704, or a combination thereof to the generate base plan module 706 to generate a base plan 730 for performing the tasks 118 of FIG. 1 on the target object 112. The generate base plan module 706 can generate the base plan 730 for performing the tasks 118 on the target object 112 based on the object parameter 702, the scan image 504, or a combination thereof.

The base plan 730 refers to a series of steps needed to perform the tasks 118, such as gripping, manipulating, transporting, or a combination thereof the target object 112. The base plan 730 can include steps needed to grip the target object 112 and transport the target object 112 from one location to another. For example, in one embodiment, the base plan 730 can include the robotic system 100 selecting the target object 112 according to the scan image 504 from a current location to another location.

As part of generating the base plan 730, the robotic system 100 can calculate a sequence of commands, settings, or a combination thereof for the actuation unit 220 of FIG. 2 that will operate the structural joints 312 of FIG. 3, the arm sections 314 of FIG. 3, the gripping unit 306 of FIG. 3, the suction grippers 308 of FIG. 3, or a combination thereof, in order to implement the base plan 730. The sequence of commands, settings, or a combination thereof, can be based on one or more constraints, goals, rules, or a combination thereof. For example, the generate base plan module 706 can use one or more processes including A* algorithm, D* algorithm, or other grid-based searches to calculate the path through space for moving the target object 112 from a pick up location to a drop off location. The sequence of commands, settings, or a combination thereof can use a further process, function, equation, translation table, or a combination thereof to convert the path into the sequence of commands or settings for the actuation unit 220.

Generating the base plan 730 can also include determining which surfaces or positions of the target object 112 can be gripped by the suction grippers 308, the suction cups 324, or a combination thereof. For example, in one embodiment, the base plan 730 can include determining which of the grip points 518 of the target object 112 are available to be gripped, the location and orientation of the grip points 518 relative to the designated areas 114 to a task location 116, other objects surrounding the target object 112, or a combination thereof. The determination can be made, for example, by determining if there are any adjacent objects or surfaces close to the grip points 518 such that gripping particular locations of the grip points 518 would not be possible.

In another embodiment, the determination can be made, for example, by determining if there is another object or surface blocking the grip points 518 of the target object 112 such that it would not be possible to grip the grip points 518 with the suction grippers 308, the suction cups 324, or a combination thereof. In another embodiment, the determination can be made, for example, by determining that the target object 112 is in a container, box, or pallet such that certain locations of the grip points 518 of the target object 112 can be gripped from one side of the container, box, or pallet, the grip points 518 on that side of the container, box, or pallet can be used to grip the target object 112, the target object 112 can be gripped at the angle 338 relative to the container, box, or pallet using certain locations of the grip points 518, or a combination thereof.

In another embodiment, the determination can be made, for example, based on the orientation of the target object 112. For example, if the target object 112 has shifted in the container, box, or pallet, such that one or more of its graspable surfaces is at the angle 338 relative to a plane, the generate base plan module 706 can determine which of the grip points 518 should be gripped and at what instance of the angle 338. As a result, the base plan 730 can be generated to determine what areas or surfaces of the target object 112 can be gripped to successfully implement the base plan 730.

In one embodiment, the generate base plan module 706 can further determine not to use one or more instances of the grip patterns 330 based on determining which of the grip points 518 of the target object 112 are blocked by other objects. For example, in one embodiment, if there are adjacent objects or surfaces blocking one or more locations of the grip points 518 of the target object 112, the generate base plan module 706 can determine that certain grip patterns 330 cannot be used to grip the target object 112, because the grip patterns 330 associated with particular locations of the grip point 518 cannot be used to grip the target object 112. In one embodiment, for example, if the generate base plan module 706 determines that the surfaces despite being blocked can be gripped by certain instances of the grip patterns 330, the generate base plan module 706 can generate the base plan 730 using the aforementioned instances of the grip patterns 330.

Similarly, if the target object 112 has one or more of its grip points 518 at the angle 338 relative to other objects or a plane, the generate base plan module 706 can determine whether certain instances of the grip patterns 330 can or cannot be used to grip the target object 112 at the particular instance of the angle 338 because, for example, the grip patterns 330, the suction grippers 308, the suction cups 324, or a combination thereof cannot operate or be used at the particular instance of the angle 338. If the generate base plan module 706 determines that one or more of the grip patterns 330 cannot be used, the generate base plan module 706 can disregard those grip patterns 330 when generating the base plan 730.

In one embodiment, the generate base plan module 706 can further use the grip pattern rank 528 when generating the base plan 730. For example, the generate base plan module 706 can generate the base plan 730 using the grip pattern rank 528 by assigning the highest ranked configuration of the grip patterns 330 for a particular instance of the target object 112 to be the grip patterns 330 to be used in the base plan 730. If the generate base plan module 706 determines that one or more of the grip patterns 330 cannot be used, the generate base plan module 706 can remove those instances of the grip patterns 330 from the base plan 730 yet preserve the order of the grip pattern rank 528, by assigning the next highest available ranked configuration of the grip patterns 330 and the grip points 518 in the grip pattern rank 528 to be used in the base plan 730 to grip the target object 112.

Once the generate base plan module 706 generates the base plan 730, control and the base plan 730 can be passed to the execute base plan module 708. The execute base plan module 708 can enable the implementation of the base plan 730 based on enabling the operation of the actuation unit 220 and other functional units of the robotic system 100 according to the sequence of commands, settings, or combination thereof. For example, the execute base plan module 708 can initiate a first set of actions, commands, instructions, or a combination thereof in the base plan 730. For a specific example, the execute base plan module 708 can enable the operation of the actuation unit 220 to place the gripping unit 306, the suction grippers 308, or a combination thereof at a location or orientation at a start location for gripping the target object 112. In one embodiment, the starting position can be defaulted to, for example, the grip points 518 at the center of mass 236 of the target object 112. If the target object 112 cannot be gripped according to the base plan 730, the execute base plan module 708 can enable the actuation unit 220 to move to the next available surface where the target object 112 can be gripped according to the base plan 708.

The execute base plan module 708 can enable the operation of the actuation unit 220 to have the gripping unit 306, the suction grippers 308, the suction cups 324, or a combination thereof engage or grip the target object 112. The target object 112 can be engaged or gripped according to the grip pattern rank 528 and the grip patterns 330, as previously determined by the evaluation module 512.

In one embodiment, the execute base plan module 708 can monitor the execution of the base plan 730. For example, if while implementing the base plan 730, the execute base plan module 708 determines that one of the surfaces of the target object 112 cannot be engaged or gripped, or one of the grip patterns 330 assigned in the base plan 730 to grip the target object 112 cannot be used, the execute base plan module 708 can cycle through the grip patterns 330 and the grip pattern rank 528 to find other instances of the grip patterns 330 that can be used to engage or grip the target object 112.

In one embodiment, the execute base plan module 708 can further set, reset, or initialize an iteration counter 732 used to track a number of gripping actions. The iteration counter 732 can be a parameter or variable used to keep track of the number of times the execute base plan module 708 attempts to enable the operation of the actuation unit 220 to grip or engage the target object 112. For example, when performing the initial grip of the target object 112, the execute base plan module 708 can set the iteration counter 732 to a value of "1," indicating that value of "1" indicates the initial attempt at gripping the target object 112. The iteration counter 732 can be used to determine whether to continue executing the base plan 730 or to stop the execution of the base plan 730. Further details of the iteration counter 732 will be discussed below.

In one embodiment, once the execute base plan module 708 enables the actuation unit 220 to engage and grip the target object 112 according to the base plan 730, the execute base plan module 708 can further enable the actuation unit 220 to perform an initial lift by enabling movement of the gripping unit 306, the suction grippers 308, or a combination thereof. The engaging and gripping of the target object 112 can be performed according to the principles set forth with respect to FIG. 3, specifically with respect to the operation of the gripping unit 306, the suction grippers 308, the suction cups 324, and the sensor unit 230 engaging the surface of the target object 112, establishing a grip on the target object 112, and measuring whether the grip is sufficient to grip the target object 112.

In one embodiment, once the execute base plan module 708 enables the initial lift, the iteration counter 732 and control can be passed to the measure established grip module 716 so that the robotic system 100 can determine whether an established grip 710 on the target object 112 is sufficient to continue implementing the base plan 730.

The measure established grip module 716 can enable the measurement of the established grip 710 using the various methods described in FIG. 3. The established grip 710 refers to a quantity, variable, measurement, or a combination thereof associated with the forces and torques applied by the suction grippers 308, the suction cups 324, or a combination thereof on the target object 112. The measure established grip module 716 can enable the measurement of the established grip 710 by obtaining the sensor readings 246 from the sensor unit 230 via the communication unit 212, and determine the forces or torques being applied to the target object 112 by the suction grippers 308, the suction cups 324, or a combination thereof as a result of the initial lift as was described with respect to FIG. 3. The established grip 710 can be an instance of the contact measure 320.

Once the measure established grip module 716 obtains the forces and torques being applied to the target object 112, the measure established grip module 716 can determine whether the forces and torques being applied to the target object 112 by the suction grippers 308 and the suction cups 324 meet at least the force threshold 322 of FIG. 3 such that the target object 112 can be successfully gripped and the base plan 730 can continue to be executed. The measure established grip module 716, in order to make the determination, can compare the forces and torques to the force threshold 322 using the same principles described with respect to FIG. 3, and determine if the target object 112 is sufficiently gripped to perform the tasks 118 on the target object 112 according to the base plan 730.

In one embodiment, for example, if the measure established grip module 716, after comparing the forces and torques, determines that the forces and torques applied to the target object 112 is less than the force threshold 322, such that the forces and torques do not meet the force threshold 322 to maintain grip sufficient to perform the tasks 118, control can be passed to the iteration count module 722 to increase the iteration counter 732 and an attempt to re-grip the target object 112 can be initiated.

The iteration count module 722 can increase the value of the iteration counter 732 after a failed attempt to grip the target object 112 by the robotic system 100. In one embodiment, once the iteration counter 732 has been increased, the iteration count module 722 can further evaluate whether the iteration counter 732 has exceeded an iteration threshold 736. The iteration threshold 736 can be a number, variable, or parameter that can represent the number of the grip patterns 330 in the base plan 730 that can be used to grip the target object 112. In one embodiment, while the iteration counter 732 is less than or equal to the iteration threshold 736, there are more grip patterns 330 that can be used to grip the target object 112, and the robotic system 100 can attempt to re-grip the target object 112 based on the grip patterns 330 remaining to grip the target object 112. Once the iteration counter 732 is increased, control can be passed to the re-grip object module 724.

The re-grip object module 724 can enable the re-gripping of the target object 112. The re-grip object module 724 can enable the re-gripping of the target object 112 by enabling the continued implementation of the base plan 730 based on operating the actuation unit 220 according to the sequence of commands, settings, or combination thereof to re-grip the target object 112. In one embodiment, the re-grip object module 724, if a particular configuration of the grip patterns 330 has failed to grip the target object 112, can attempt to re-grip the target object 112 by cycling through the grip patterns 330 that can be executed, according to the base plan 730, to re-grip the target object 112.

The re-grip object module 724 can cycle through the grip patterns 330 in a variety of ways. For example, in one embodiment, after a failed grip attempt, the re-grip object module 724 can attempt to re-grip the target object 112 at one or more of the same locations of the grip points 518 using a different configuration of the grip patterns 330 if possible. In another embodiment, the re-grip object module 724 can choose other locations of the grip points 518 of the target object 112 that have been determined to be capable of gripping according to the base plan 730, and attempt to re-grip the target object 112 at the different locations of the grip points 518, using one or more of the grip patterns 330 associated with the grip points 518.

In one embodiment, the re-grip object module 724 can further attempt the re-grip the target object 112 according to the grip pattern rank 528. For example, the re-grip object module 724 can attempt a re-grip of the target object 112 based on cycling through the grip pattern rank 528 from highest ranked grip patterns 330 to the lowest ranked configuration of the grip patterns 330, and attempt to grip the target object 112 based on the grip patterns 330 along the associated locations of the surface of the target object 112. As a result, the re-grip object module 724 can attempt to re-grip the target object 112 based on the grip pattern rank 528 using the grip points 518 and the grip patterns 330 that will provide an even distribution of force across the target object 112.

In one embodiment, after attempting to re-grip the target object 112, control can once again be passed to the measure established grip module 716 to determine the forces and torques being applied to the target object 112, in the same manner that was described above. If the attempted re-grip is producing forces and torques that once again do not meet the force threshold 322, the robotic system 100 can attempt to perform a re-grip of the target object 112 as described above until the iteration counter 732 exceeds the iteration threshold 736. In one embodiment, once the iteration counter 732 exceeds the iteration threshold 736, control can be passed to the stop base plan execution module 726.

The stop base plan execution module 726 can stop the execution of the base plan 730 based on the iteration counter 732 exceeding the iteration threshold 736. The stop base plan execution module 726 can enable the ending of the base plan 730 by shutting off or turning off the vacuum hoses, vacuum generators, and the actuation unit 220 of the robotic system 100. In one embodiment, once the stop base plan execution module 726 enables the ending of the base plan 730, control can be passed to the generate error module 728.

The generate error module 728 can enable the sending of an error 738 based on the failed grip of the target object 112. The error 738 can be a visual or audible message, a signal, a numerical code, or a combination thereof. In one embodiment, the generate error module 728 can send the error 738 via the communication unit 212 to the other functional units of the robotic system 100, a user of the robotic system 100, an external system, or a combination thereof, indicating the failed grip.

Continuing with the example, if, however, the attempted grip or re-grip of the target object 112 produces forces and torques that are greater than or equal to the force threshold 322, the measure established grip module 716 can determine that the forces and torques applied to the target object 112 are sufficiently strong to continue implementing the base plan 730, and control can be passed to the continue executing base plan module 720 to continue implementing the base plan 730. Accordingly, the robotic system 100 can continue implementing the base plan 730 according to the remaining sequence of commands or settings. For example, the robotic system 100 can transfer, for example, vertically, horizontally, or a combination thereof, or re-orient the target object 112 according to the base plan 730.

The continue executing base plan module 720 can further enable the monitoring of the base plan 730, by continuing to monitor the forces and torques on the target object 112 during the continued execution of the base plan 730. The continue executing base plan module 720 can do so by coupling to the measure established grip module 716 during the continued execution of the base plan 730 and having the measure established grip module 716 determine whether the established grip 710 on the target object 112 is sufficient to continue executing the base plan 730. In one embodiment, if the measure established grip module 716 determines that the forces and torques on the target object 112 fall below the force threshold 322 anytime during the continued execution of the base plan 730, the continue executing base plan module 720 can attempt to address the issue by adjusting the speed 340 of FIG. 3 and the acceleration 342 of FIG. 3 of the arm unit 102 to re-establish a grip on the target object 112, as was described with respect to FIG. 3, so that the forces and torques on the target object 112 are sufficient to grip the target object 112 without dropping the target object 112.

As an example, if the torque on the target object 112 is determined to be more than the force generated by the suction grippers 308 or the suction cups 324 to maintain a grip on the target object 112, the continue executing base plan module 720 can adjust the speed of the arm unit 102 to compensate for the torque on the target object 112, by for example, lowering the speed 340 and the acceleration 342 of the arm unit 102.

In another embodiment, if one or more suction grippers 308 lose grip on the target object 112 during the execution of the base plan 730, the continue executing base plan module 720 can attempt to place the target object 112 back in the box, bin, pallet, or back at the location at which the target object 112 was picked up from, and have the re-grip object module 724 attempt to re-grip the target object 112. In another embodiment, the continue executing base plan module 720 can further adjust the position of the arm unit 102, for example, rotating the arm unit 102, so as to maintain a grip on the target object 112.

In one embodiment, if the continue executing base plan module 720 determines that the target object 112 has been safely transported to its destination based on the base plan 730, the continue executing base plan module 720 can pass control to the scan module 502 to begin the process again for the next instances of the target object 112. In one embodiment, if there are no other instances of the target objects 112 to generate the base plan 730 for, the robotic system 100 can stop the operation.

The robotic system 100 has been described with module functions or order as an example. The robotic system 100 can partition the modules differently or order the modules differently. For example, the software 210 of FIG. 2 can include the modules for the robotic system 100. As a specific example, the software 210 can include the scan module 502, the identify object module 704, the generate base plan module 706, the execute base plan module 708, the measure established grip module 716, the continue executing base plan module 720, the iteration count module 722, the re-grip object module 724, the stop base plan execution module 726, the generate error module 728, and associated sub-modules included therein.

The control unit 202 of FIG. 2 can execute the software 210 to operate the modules. For example, the control unit 202 can execute software to implement the scan module 502, the identify object module 704, the generate base plan module 706, the execute base plan module 708, the measure established grip module 716, the continue executing base plan module 720, the iteration count module 722, the re-grip object module 724, the stop base plan execution module 726, the generate error module 728, and associated sub-modules included therein.

The modules described in this application can be implemented as instructions stored on a non-transitory computer readable medium to be executed by the control unit 202. The non-transitory computer readable medium can include the storage unit 206. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the robotic system 100 or installed as a removable portion of the robotic system 100.

Figure 8:
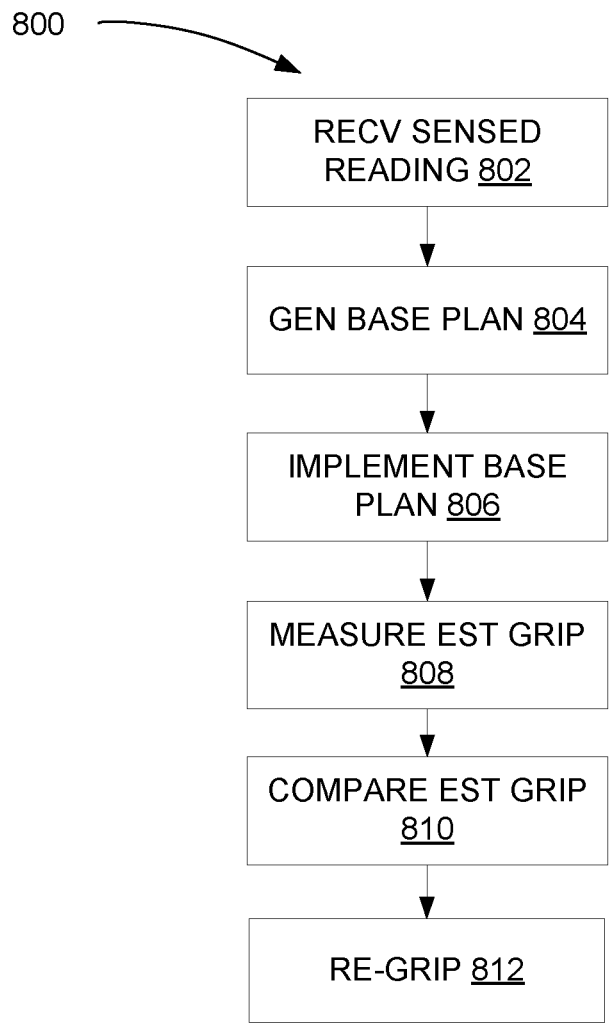
FIG. 8 is a flow chart of a method of operating the robotic system in an embodiment of the present invention.

Referring now to FIG. 8, therein is shown a flow chart of a method 800 of operating the robotic system in an embodiment of the present invention. The method 800 includes receiving a sensed reading associated with a target object in block 802; generating a base plan for performing a task on the target object, wherein generating the base plan includes determining a grip point and a grip pattern associated with the grip point for gripping the target object based on a location of the grip point relative to a designated area, a task location, and another target object in box 804; implementing the base plan for performing the task by operating an actuation unit and one or more suction grippers according to a grip pattern rank to generate an established grip on the target object, wherein the established grip is at a grip pattern location associated with the grip pattern used to grip the target object in box 806; measuring the established grip in box 808; comparing the established grip to a force threshold in box 810; and re-gripping the target object based on the established grip falling below the force threshold in box 812.

The above detailed description and embodiments of the robotic system 100 are not intended to be exhaustive or to limit the disclosed robotic system 100 to the precise form disclosed above. While specific examples for the robotic system 100 are described above for illustrative purposes, various equivalent modifications are possible within the scope of the disclosed robotic system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method, process, apparatus, device, product, and system is cost-effective, highly versatile, and accurate, and can be implemented by adapting components for ready, efficient, and economical manufacturing, application, and utilization. Another important aspect of an embodiment of the present invention is that it valuably supports and services the historical trend of reducing costs, simplifying systems, and increasing performance.

These and other valuable aspects of the embodiments of the present invention consequently further the state of the technology to at least the next level. While the invention has been described in conjunction with a specific best mode, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a robotic system comprising:
receiving a sensor reading associated with a target object;
generating a base plan for performing a task on the target object, wherein generating the base plan includes determining a grip point and one or more grip patterns associated with the grip point for gripping the target object based on a location of the grip point relative to a designated area, a task location, and another target object;
generating a grip pattern rank based on aligning the target object with a grip pattern location and determining which of the grip patterns at the grip pattern location are for using all of suction grippers associated with the grip patterns to grip the target object;
implementing the base plan for performing the task by operating an actuation unit and one or more of the suction grippers according to grip pattern rank, to generate an established grip on the target object, wherein the established grip is at the grip pattern location associated with the grip patterns;
measuring the established grip;
comparing the established grip to a force threshold; and
re-gripping the target object based on the established grip falling below the force threshold.

2. The method as claimed in claim 1 further comprising re-gripping the target object based on an iteration counter being below an iteration threshold.

3. The method as claimed in claim 1 further comprising generating an error based on an iteration counter exceeding an iteration threshold.

4. The method as claimed in claim 1 further comprising identifying the grip point based on a center of mass of the target object.

5. The method as claimed in claim 1 further comprising identifying the grip point based on a center of mass of the target object, and a surface contour of the target object, a thickness of the surface of the target object, a composition of the surface of the target object, or a combination thereof.

6. The method as claimed in claim 1 further comprising determining the grip pattern location based on a geometric center of a suction cup and a weight factor.

7. The method as claimed in claim 1 further comprising:
monitoring the established grip during the implementing the base plan; and
generating instructions for adjusting a speed and an acceleration of an arm unit based on the established grip falling below the force threshold.

8. A robotic system comprising:
a communication unit configured to:
receive a sensor reading associated with a target object;
a control unit, coupled to the communication unit, configured to:
generate a base plan for performing a task on the target object, wherein generating the base plan includes determining a grip point and one or more grip patterns associated with the grip point for gripping the target object based on a location of the grip point relative to a designated area, a task location, and another target object;
generate a grip pattern rank based on aligning the target object with the grip pattern location and determining which of the grip patterns at a grip pattern location are for using all of suction grippers associated with the grip patterns to grip the target object;
implement the base plan for performing the task by operating an actuation unit and one or more of the suction grippers according to the grip pattern rank, to generate an established grip on the target object, wherein the established grip is at the grip pattern location associated with the grip patterns;
measure the established grip;
compare the established grip to a force threshold; and
re-grip the target object based on the established grip falling below the force threshold.

9. The system as claimed in claim 8 wherein the control unit is further configured to re-grip the target object based on an iteration counter being below an iteration threshold.

10. The system as claimed in claim 8 wherein the control unit is further configured to generate an error based on an iteration counter exceeding an iteration threshold.

11. The system as claimed in claim 8 wherein the control unit is further configured identify the grip point based on a center of mass of the target object.

12. The system as claimed in claim 8 wherein the control unit is further configured to identify the grip point based on a center of mass of the target object, and a surface contour of the target object, a thickness of the surface of the target object, a composition of the surface of the target object, or a combination thereof.

13. The system as claimed in claim 8 wherein the control unit is further configured to determine the grip pattern location based on a geometric center of a suction cup and a weight factor.

14. A non-transitory computer readable medium including instructions for a robotic system comprising:
receiving a sensor reading associated with a target object;
generating a base plan for performing a task on the target object, wherein generating the base plan includes determining a grip point and one or more grip patterns associated with the grip point for gripping the target object based on a location of the grip point relative to a designated area, a task location, and another target object;
generating a grip pattern rank based on aligning the target object with the grip pattern location and determining which of the grip patterns at a grip pattern location are for using all of suction grippers associated with the grip patterns to grip the target object;
implementing the base plan for performing the task by operating an actuation unit and one or more of the suction grippers according to the grip pattern rank, to generate an established grip on the target object, wherein the established grip is at the grip pattern location associated with the grip patterns;
measuring the established grip;
comparing the established grip to a force threshold; and
re-gripping the target object based on the established grip falling below the force threshold.

15. The non-transitory computer readable medium as claimed in claim 14 with instructions further comprising identifying the grip point based on a center of mass of the target object.

16. The non-transitory computer readable medium as claimed in claim 14 with instructions further comprising identifying the grip point based on a center of mass of the target object, and a surface contour of the target object, a thickness of the surface of the target object, a composition of the surface of the target object, or a combination thereof.

17. The non-transitory computer readable medium as claimed in claim 14 with instructions further comprising determining the grip pattern location based on a geometric center of a suction cup and a weight factor.

* * * * *